(12) United States Patent
Tollefson

(10) Patent No.: US 7,428,833 B2
(45) Date of Patent: Sep. 30, 2008

(54) VEHICLE MOUNTABLE PERSONAL PROPERTY LOCK ASSEMBLY

(75) Inventor: Dale Anton Tollefson, Brush Prairie, WA (US)

(73) Assignee: Peak Recreational Products, LLC, Brush Prairie, WA (US)

( * ) Notice: Subject to any disclaimer, the term of this patent is extended or adjusted under 35 U.S.C. 154(b) by 217 days.

(21) Appl. No.: 11/020,964

(22) Filed: Dec. 22, 2004

(65) Prior Publication Data

US 2006/0130541 A1 Jun. 22, 2006

(51) Int. Cl.
  *E05B 67/06* (2006.01)
(52) U.S. Cl. .................. 70/49; 70/14; 70/58; 70/233
(58) Field of Classification Search .................. 70/14, 70/30, 49, 58, 233
See application file for complete search history.

(56) References Cited

U.S. PATENT DOCUMENTS

| | | | |
|---|---|---|---|
| 2,440,744 A * | 5/1948 | Grinnell et al. | 70/232 |
| 3,605,458 A | 9/1971 | Best | |
| 3,728,879 A | 4/1973 | Best | |
| 3,841,118 A | 10/1974 | Stone | |
| 3,879,721 A | 4/1975 | Yereance | |
| 3,922,897 A * | 12/1975 | Mickelson | 70/232 |
| 3,950,972 A | 4/1976 | Bleier et al. | |
| 3,982,413 A * | 9/1976 | Stone et al. | 70/229 |
| 3,987,653 A | 10/1976 | Lyon et al. | |
| 4,044,577 A | 8/1977 | Horlacher | |
| 4,086,795 A | 5/1978 | Foster et al. | |
| 4,098,099 A | 7/1978 | Smith | |
| 4,141,233 A * | 2/1979 | Reyes | 70/232 |
| 4,404,822 A * | 9/1983 | Green | 70/233 |
| 4,502,305 A | 3/1985 | Bakker | |
| 4,620,718 A * | 11/1986 | Mickelson | 280/507 |
| 4,665,724 A | 5/1987 | Sakai | |
| 4,693,098 A | 9/1987 | Davis et al. | |
| 4,760,719 A | 8/1988 | Evans et al. | |
| 4,845,967 A | 7/1989 | Evans et al. | |
| 5,052,203 A * | 10/1991 | Van Cuyk | 70/232 |
| 5,136,863 A * | 8/1992 | Richardson | 70/14 |
| 5,181,405 A * | 1/1993 | Wheeler | 70/232 |
| 5,255,545 A * | 10/1993 | Wheeler | 70/232 |
| 5,531,083 A | 7/1996 | Franck, III et al. | |
| 5,572,821 A | 11/1996 | Coleman | |

(Continued)

FOREIGN PATENT DOCUMENTS

NL 8300-423 A 9/1984

*Primary Examiner*—Suzanne D Barrett
(74) *Attorney, Agent, or Firm*—Fields IP, PS

(57) ABSTRACT

A personal property lock assembly mountable to a vehicle may comprise a cable lock, a protrusion with a plateaued surface of a lockbox, a mount coupler comprising a seating surface to seat against the plateaued surface and a mounting mechanism, and a fastener. The lock assembly may comprise one or more locking mechanisms to provide securement to a cable lock that is anchored to a vehicle by way of a coupler. The lock assembly further comprises a cable reel assembly and a cable receiving mechanism operable together to retractably store and allow extension of a length of a cable. A cable locking mechanism removably binds and locks an end portion of the cable operably inserted in the cable receiving mechanism. As referenced herein, various mount couplers are effective for binding the cable lockbox to respective vehicles, which may also be disclosed with alternative embodiments.

25 Claims, 27 Drawing Sheets

U.S. PATENT DOCUMENTS

| | | | | |
|---|---|---|---|---|
| 5,598,727 | A | 2/1997 | White | |
| D381,254 | S | 7/1997 | Collins | |
| 5,669,571 | A | 9/1997 | Graybill | |
| 5,768,920 | A * | 6/1998 | DeBevoise | 70/18 |
| 5,786,759 | A | 7/1998 | Ling | |
| D414,675 | S * | 10/1999 | Niswanger | D8/333 |
| 5,960,652 | A | 10/1999 | Marmstad | |
| 6,024,372 | A * | 2/2000 | Colibert et al. | 280/417.1 |
| D434,965 | S | 12/2000 | Ling | |
| D435,428 | S | 12/2000 | Ling | |
| 6,161,402 | A * | 12/2000 | Moore | 70/14 |
| D436,015 | S | 1/2001 | Yu | |
| 6,192,720 | B1 | 2/2001 | Kan | |
| 6,212,710 | B1 | 4/2001 | Jones | |
| 6,227,016 | B1 | 5/2001 | Yu | |
| D450,560 | S | 11/2001 | Yu | |
| 6,352,277 | B1 * | 3/2002 | Timmings | 280/437 |
| 6,389,854 | B1 | 5/2002 | Huang | |
| D460,341 | S | 7/2002 | Ling | |
| 6,418,766 | B1 | 7/2002 | Luebeck | |
| 6,481,250 | B1 | 11/2002 | Kuo | |
| 6,540,246 | B2 * | 4/2003 | Andersen et al. | 280/417.1 |
| 6,581,420 | B1 | 6/2003 | Ling et al. | |
| 6,588,239 | B1 * | 7/2003 | Johansson | 70/14 |
| 6,588,638 | B1 | 7/2003 | Luebeck et al. | |
| 6,609,399 | B1 | 8/2003 | Daniels, Jr. | |
| 6,619,980 | B1 | 9/2003 | Hsiao | |
| 6,761,050 | B2 * | 7/2004 | Rosenberg | 70/14 |
| 6,848,282 | B2 * | 2/2005 | Palzkill et al. | 70/14 |
| 6,909,046 | B2 | 6/2005 | Laity et al. | |
| 6,971,660 | B1 * | 12/2005 | Putnam | 280/416.1 |
| 7,000,746 | B2 | 2/2006 | Mackin et al. | |
| 7,108,544 | B2 | 9/2006 | Zoller | |
| 2002/0170324 | A1 * | 11/2002 | Wilson | 70/233 |
| 2004/0083776 | A1 * | 5/2004 | Rosenberg | 70/14 |
| 2006/0112739 | A1 * | 6/2006 | Hogesta | 70/33 |
| 2007/0063483 | A1 * | 3/2007 | Thomsen | 280/507 |

* cited by examiner

VEHICLE MOUNTABLE PERSONAL PROPERTY LOCK ASSEMBLY

BACKGROUND

The present disclosure relates to locks and, more particularly, to vehicle mountable personal property lock assemblies.

Cable locks may be used to secure various types of personal property. For example, some cable locks may be used to secure a bicycle to a bicycle rack. Other cable locks may be used to secure, e.g., a notebook computer to a person, to a table, or to another object. Yet other cable locks may be used to secure other types of personal property (e.g., ATV, motorcycle, bicycle, camping gear, etc.).

Both a cable lock and the personal property being locked may be lightweight. Therefore, it may be desirable in some circumstances to anchor a cable lock to a large, heavy, and/or immovable object. Such an object may comprise, e.g., a bicycle rack, a post, a person, etc. A desirable characteristic of such an object may be the difficulty a thief may encounter in trying to move the object, perhaps because of the object's size or weight.

At times it may be desirable to travel to various locations with personal property and a cable lock. However, some visited locations may not have a suitable object to which the cable lock and personal property may be secured.

Cable locks may often be used for a specific type of personal property (e.g., a bicycle cable lock, a notebook computer cable lock, etc.). A cable lock's weight, diameter, and/or length may be related to its intended use. For example, a rather short, thin, and/or lightweight cable lock may be used to secure a laptop computer to a person. A considerably longer and heavier cable lock may be used to secure a kayak to a tree or a bicycle to a bicycle rack.

In some circumstances, it may be desirable to use a cable lock to secure more than a single piece of personal property. In such cases, an important characteristic of a cable lock may be whether it has sufficient length to secure a plurality of items of personal property. However, a cable with excessive length may be cumbersome to use or carry.

In modern society, people and their possessions have become more mobile. Vehicles such as automobiles, trucks, trailers, and fifth-wheel trailers have become commonplace. As people travel, whether to parks, campsites, or on extended road trips, they may desire various means of securing their personal property. Cable locks may be one such means of securing such personal property.

SUMMARY

According to an embodiment of the present invention, a personal property lock assembly may comprise a cable lockbox and a coupler operable to secure the lockbox to a vehicle. The coupler may comprise a seating surface to seat on a plateaued surface of the lockbox and a locking mechanism operable to secure the coupler's mounting to the vehicle.

In a further embodiment, the lockbox may comprise a flexible cable retrievably stored within the lockbox, which may be retrievably withdrawn from the lockbox, passed through or wound about personal property and then fastened to a cable receiving mechanism of the lockbox. In use, the first end of the cable may be fixed to a cable reel operable to retractably wind and store a length of the cable. A second end of the cable may be terminated with a cable retention knob or a mating head, which may be kept outside the lockbox per a diameter greater than an exit port of the lockbox through which the cable is threaded. A butt-end of the retention knob or mating head may be defined with a narrowing taper of an angle operable to seat with non-binding engagement within a tapered opening defined by the exit port. When interacting with a locking mechanism associated with a receiving port of the housing, the retention knob on the second end of the cable may be captured by the locking mechanism.

In another embodiment, the second end of the cable may be terminated with a mating head that may define a elongated slot passing therethrough of width sufficient to allow insertion of an arm of a padlock.

As referenced in this disclosure, various embodiments of the coupler may be distinguished by different descriptors. In one embodiment, the coupler may be described as a C-clip coupler that may be fastened to a flange of an I-beam or a C-beam associated with a vehicle chassis. In another embodiment, it may be described as a receiver mount coupler that may be inserted and fastened to a receiver hitch of a vehicle. In yet another embodiment, it may be described as a fifth-wheel mount coupler that may be shaped to slot a flared end to a lock pole associated with a fifth wheel trailer. In still yet another embodiment, it may be described as a ball-hitch coupler that may be coupled to a ball-receiving unit to a trailer hitch.

BRIEF DESCRIPTION OF THE DRAWINGS

The subject matter of embodiments of the present invention may be understood by reference to the following detailed description and with reference to the accompanying drawings, in which.

DETAILED DESCRIPTION

Figure 1A:
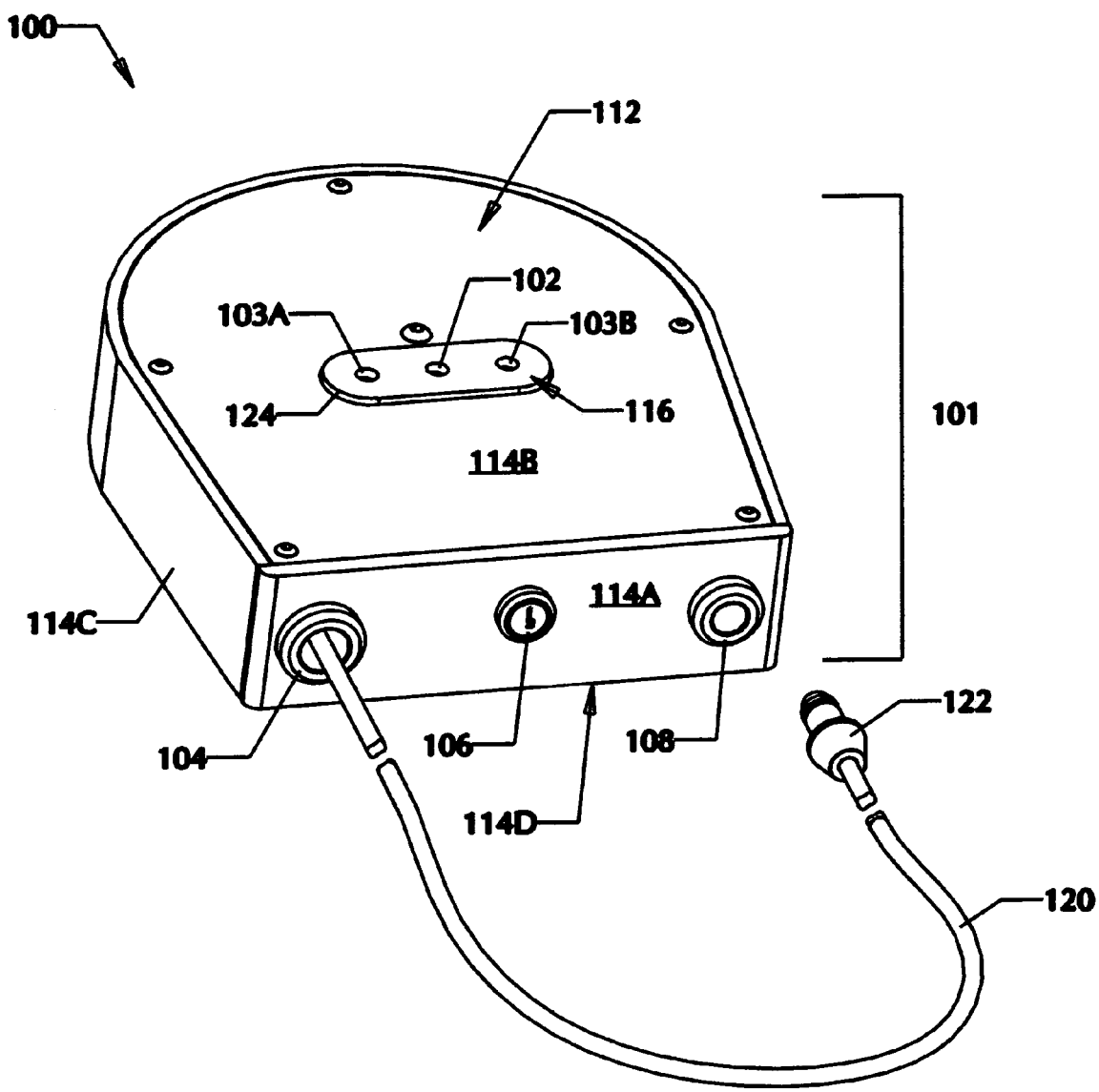
FIG. 1A is a simplified perspective drawing of a personal property lock assembly (e.g., a lockbox), consistent with some embodiments of the present invention, showing the lockbox with a plateaued surface for mounting to a coupler and a cable to secure personal property.

While the invention is amenable to various modifications and alternative forms, specifics of particular embodiments have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

In the description that follows, readily established structures for the exemplary embodiments may be disclosed in simplified form (e.g., simplified housing, lock pins and/or simplified description) to avoid obscuring an understanding of the embodiments with excess detail and where persons of ordinary skill in this art can readily understand their structure and formation by way of the drawings and disclosure. For the same reason, identical components may be given the same reference numerals, regardless of whether they are shown in different embodiments of the invention.

The term "vehicle" is used herein in its broad sense and, depending upon context, may refer to call types of vehicles including, without limitation, automobiles, trucks, travel trailers, fifth-wheel trailers, utility trailers, tractors, etc.

In a given application and consistent with one embodiment of the present invention, a cable lock box may be anchored by way of a coupler to a vehicle for use in securing one or more items of personal property. A retractable cable of the cable lockbox may be pulled and extended from the lockbox, passed through passages of the personal items, and then locked appropriately upon itself or to a locking member or latch of the cable lockbox. Given that the vehicles may be defined by a variety of different features and/or hitching configurations, various embodiments may be described for the coupler that is to bind the lockbox to the vehicle.

As referenced in this disclosure, various embodiments of the coupler may be distinguished by different descriptors. In one embodiment, referencing FIGS. 5A-B and 6A-C, the coupler may be described as a C-clip coupler. In another embodiment, referencing FIGS. 7A-B and 8A-C, it may be described as a receiver mount coupler. For another embodiment, referencing FIGS. 9A-B and 10A-C, it may be described as a fifth-wheel mount coupler; and, in yet another embodiment referenced by FIGS. 11A-B and 12A-C, it may be described as a ball-hitch coupler. Each of these types of couplers may be effective for binding the cable lockbox to respective vehicles, which may also be disclosed with alternative embodiments.

Cable lock 100 may comprise a housing 101 defined by walls 114A-114D, the inside surfaces of which may define an inner chamber 180. Inner housing 180 may house a reel assembly 171 operably attached to at least one inner surface or between two opposing of walls 114B, 114D. Reel assembly 171 may be rotationally operable to store and/or allow retractable extension of a length of cable 120. Referencing FIGS. 1B and 1D, cable 120 may have a first end portion 126 anchored to reel assembly 171 and the second end portion that may be extended outside of housing 101 through exit orifice 104 defined in the faceplate or front wall 114A. In operation, the second end portion of cable 120 may be passed through or wound about personal property and then inserted into a cable receiving mechanism that may be integrated together in/on a wall for housing 101.

Figures 1B, 1C:
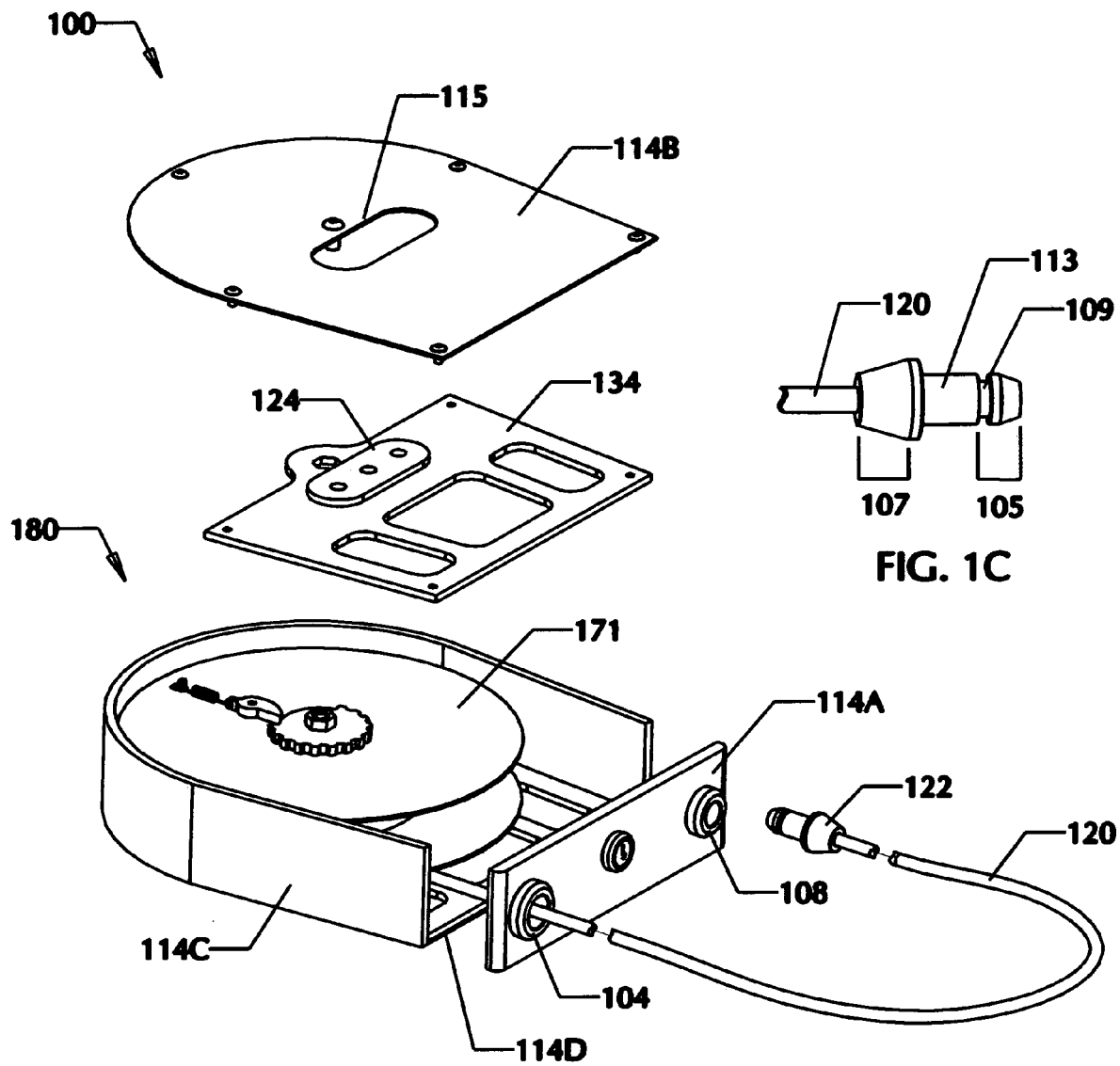
FIG. 1B is a simplified exploded assembly view showing a portion of an interior assembly of the lockbox of FIG. 1A, and showing a top plate, an intermediate plate with a protrusion, a cable reel within a bottom assembly, and a face plate with a cable extending therethrough.
FIG. 1C is a simplified perspective view of a cable retention knob in accordance with an embodiment of the present invention.
Figure 1D:
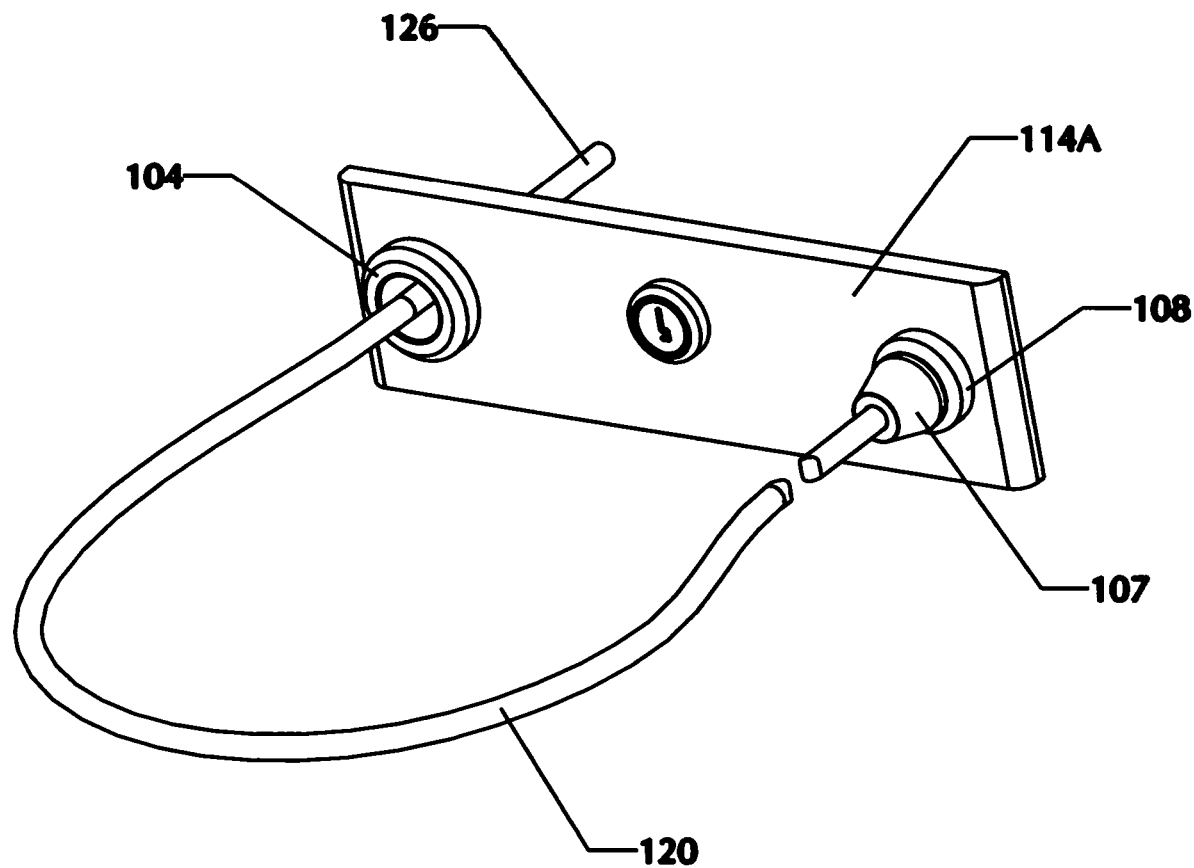
FIG. 1D is a simplified perspective view showing the cable retention knob of FIG. 1C operable to interact with a cable receiving mechanism of the lockbox of FIG. 1A, according to an embodiment of the present invention.
Figure 2A:
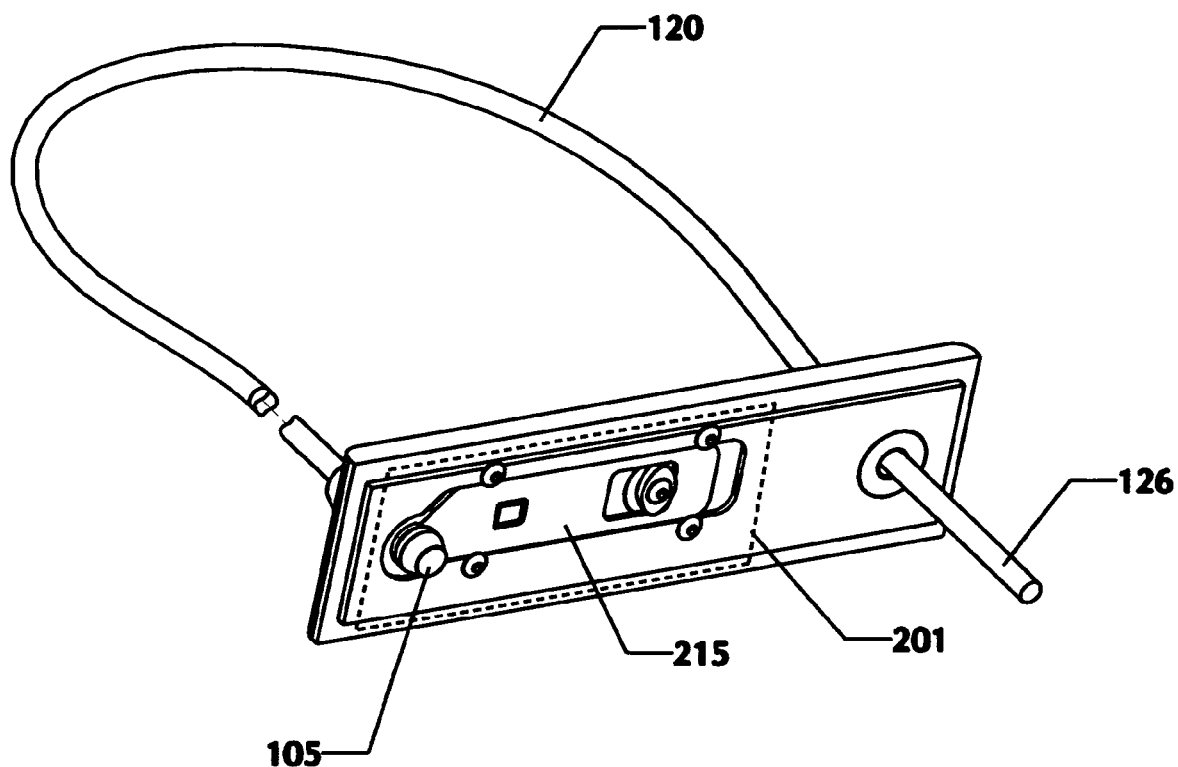
FIGS. 2A, 2B are perspective and assembly views of a face plate with a locking mechanism, in accordance with certain embodiments of the present invention, disposed with a front wall of the lockbox of FIG. 1A.
Figure 2B:
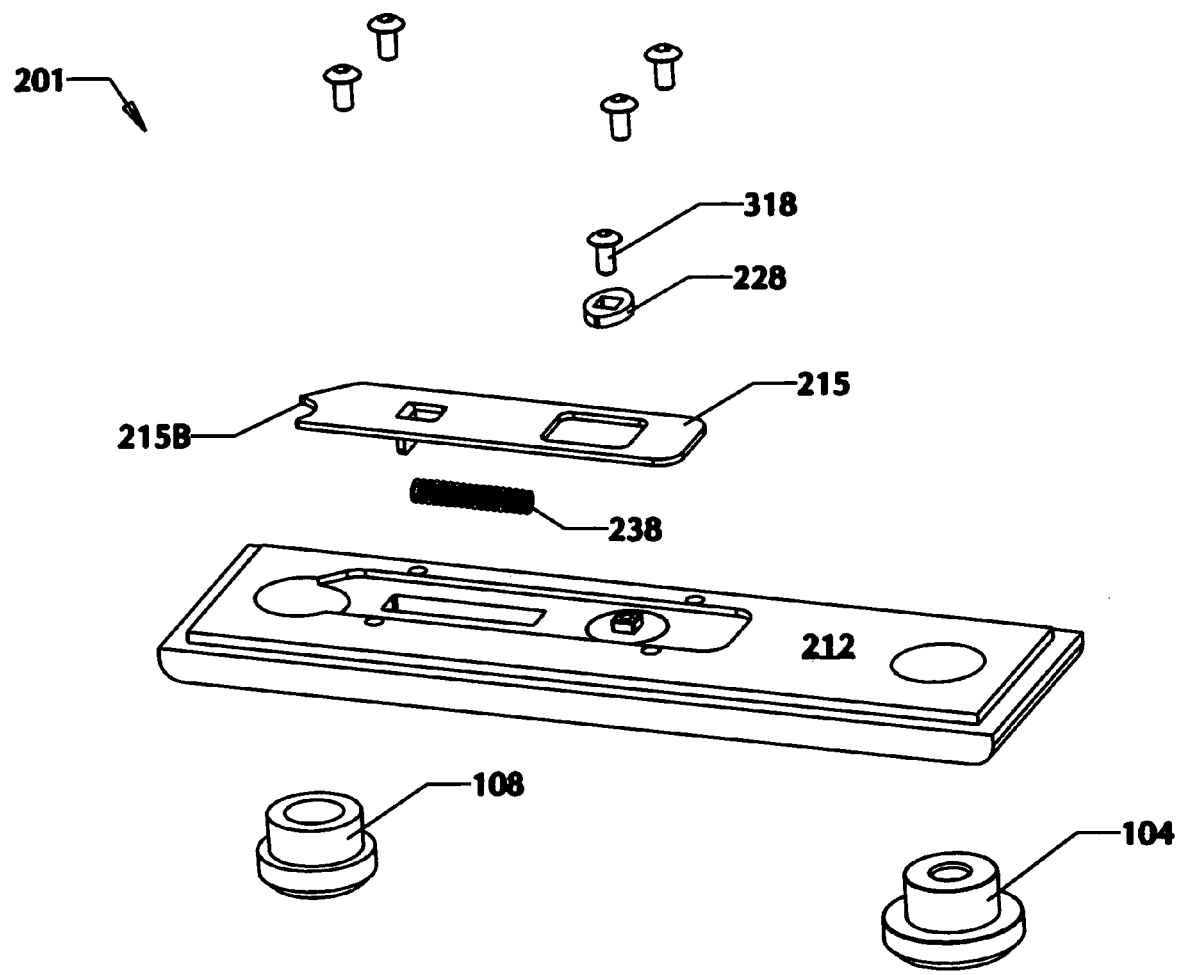

For example, referencing FIGS. 1A-1C, the second end of cable 120 may terminate with coupling to a cable retention knob 122 (e.g., tip, knob, phallic head, securing pin, locking head, keyed plug, etc.). In accordance with one embodiment, the cable retention knob 122, defined by a cylindrical shaft 113 between a butt-end 107 (e.g., tapered) and a distal end 105, may be shaped for seated insertion into cable receiving mechanism 108. The distal end may be shaped for plug insertion and capture within a receiving port of the cable receiving mechanism and a locking mechanism 201 (FIGS. 2A, 2B) of the front wall of the housing. Further referencing FIG. 1C, butt-end 107 of the cable retention knob may flare outwardly from the cable diameter toward that of its cylindrical shaft 103, the flare-out being angled to fit a tapered opening of cable receiving mechanism 108 for a non-binding engagement. That is, when the cable has been fully retracted for storage within the housing, the shoulder defined by the butt-end of the cable retention knob may be seated in non-binding engagement within the tapered passage defined by exit orifice 104.

Figure 3:
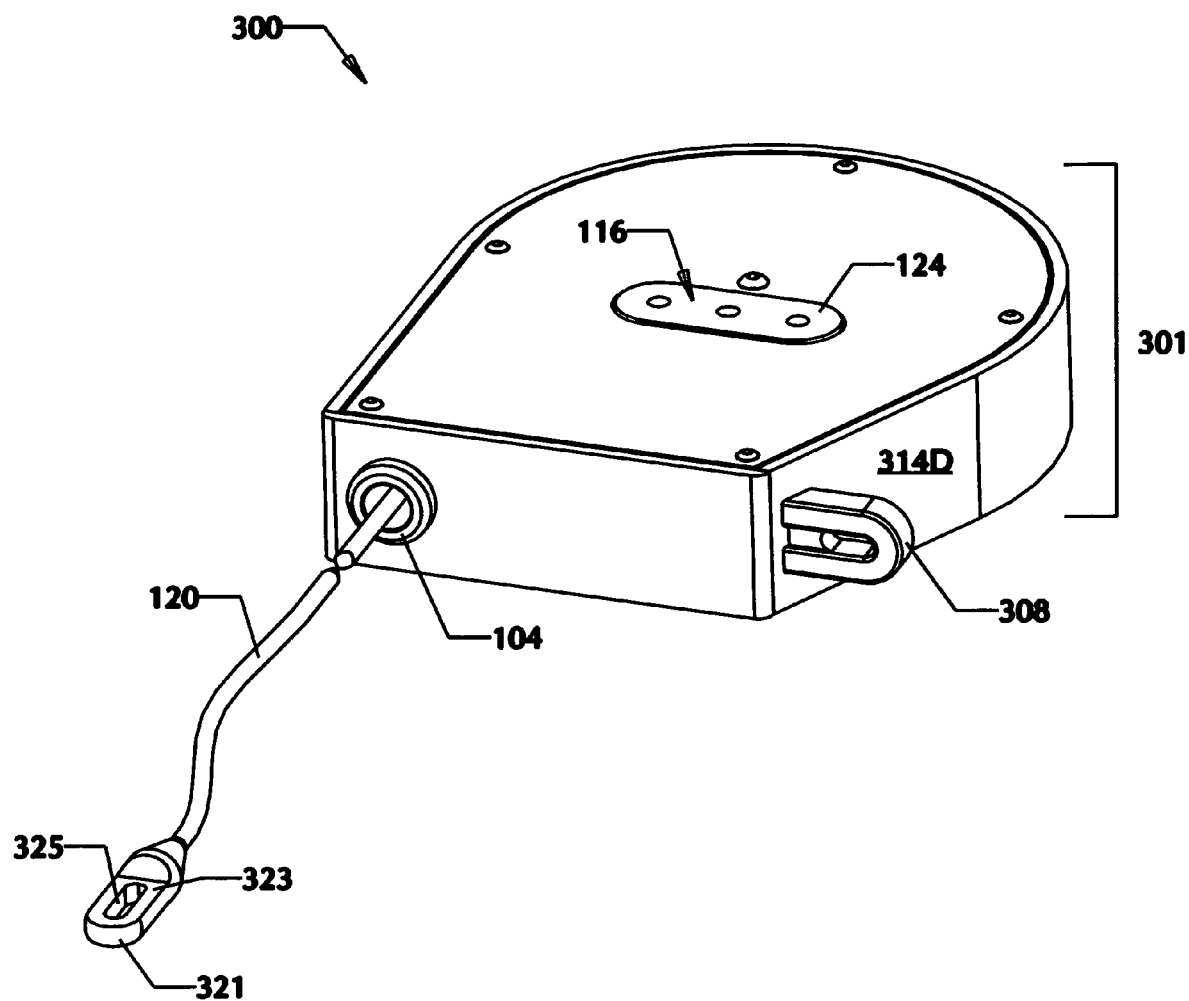
FIG. 3 is a simplified perspective drawing of another personal property lock assembly (e.g., a lockbox), consistent with certain embodiments of the present invention, showing a u-bar of the lockbox operable to receive and secure a mating head anchored to one end of a cable.

Continuing with reference to FIGS. 1A, 1B, 3, plateaued surface 116 may be defined by a surface of a protrusion 124 that may extend outwardly a wall 114B of the housing. In some embodiments, protrusion 124 and wall 114B may be a single unitary structure, e.g., a single casting or welded structure. In other embodiments, protrusion 124 and wall 114B may be removably affixed (FIG. 1B), wherein protrusion 124 may be disposed on a surface of an intermediate plate 134 for elevated placement through an opening 115 in the tope plate or wall 114B of the housing. Other relationships are possible,—protrusion 124 being part of a structure, e.g., rib, cross bar, etc., or may be associated with an internal frame or chassis of the lockbox assembly.

Further referencing FIGS. 1A-B and 3, the plateaued surface 116 of protrusion 124 may further define openings or tapped holes 102, 103A, 103B that may be operable to receive fastening pins or screws for assisting alignment and/or securement of the coupler thereto. During assembly, fastening pins or screws may align, by way of these holes, placement of a seating surface of a coupler relative to and against the plateaued surface of the protrusion of the lockbox.

Referencing FIGS. 1A-1D, 2A, 2B, in particular embodiments, lockbox 100 may further comprise locking mechanism 201 within or disposed with the front wall 114A of the housing. Aligned with the cable receiving port 108 as defined in the face plate or front wall 114A, the locking mechanism 201 may interact with the head of the cable retention knob 122 to enable latched capture thereof. Further, once inserted therein, the cable retention knob 122 may be locked within the capture of the locking mechanism until the locking mechanism is unlocked. In some embodiments, locking mechanism 201 may comprise a keyhole 106 through the exterior of faceplate 114A that may allow passage of a key of known operability for enabling rotational keyed operation of the lock assembly 201 (e.g., locking mechanism) between locked and unlocked states. Referencing FIG. 2B, locking mechanism 201 may comprise spring-biased sliding plate 215 (FIG. 2B) operable to latch a knob of lock cable retention knob 122 with the assistance of spring 238. That is, when a locked state is intended, the key may be positioned to a relaxed state and the sliding plate 215 may be biased with a force toward the receiving port 108. The latching end of the sliding plate may define an outline to a partial circumference or arc that may wrap a partial circumference of a knob of the cable retention knob. Under bias, the sliding plate may slide inwardly as the knob of the cable retention knob is inserted into the receiving port. But, once the knob is fully inserted into the receiving port, the latching end 215B of the biased sliding plate 215 may spring back into the coaxial recess log defined around the cable retention knob so as to capture the knob and lock the cable retention knob 122 in place. To unlock the cable retention knob 122, the key in the keyed slot 106 may be turned. Rotation of the keyed slot 106, in turn, may rotate cam 228 operable to slide the sliding plate 215 inwardly against the force of the biasing spring 238. Eventually, as the spring compresses under the force provided by the rotation of the keyed slot 106, the latching end 215B of the slide plate 215 may clear an outer circumference of the cable retention knob 122, wherein the knob may be released by the locking mechanism 201 and withdrawn from cable receiving port 108. In other embodiments, other cable receiving and/or locking mechanisms may be used to secure a mating head or a knob associated with cable 120.

For example, further referencing FIG. 3, lockbox 300 of another embodiment may comprise a cable receiving mechanism 308 (e.g., u-bar) mounted onto the exterior of wall 314D of the housing. In some embodiments, u-bar 308 and wall 314D may be made as a single unitary structure, e.g., during the casting or molding process for manufacture of walls for housing 301. Alternatively, u-bar 308 may be mounted onto wall 314D by at least one of the typical mounting methods such as welding and bolting. As a cable receiving mechanism, u-bar 308 may be shaped and positioned to operably receive mating head 322 of an alternative embodiment for cable termination. Thus, mating head 322 at the distal end of the cable may comprise an appropriate circumference that may pass through the passage defined by the u-bar 308 and the housing sidewall.

In a particular embodiment, mating head 322 may be locked to u-bar 308 by a locking mechanism, e.g., a lock (not shown) of any suitable type that may fit through some aligned passages defined by a mating head (e.g., slot, groove, etc.) of any suitable shape yet operable to prevent withdrawal of the mating head from the passages of the receiving mechanism. For example, a slot 325 may be defined into a tab section 323 of the mating head to align with corresponding passages in u-bar 308 to allow insertion of the lock therethrough for securement of mating head 322. In one embodiment, the tab may define a slot of width sufficient for receipt of a lock-arm/shank/etc.

In a further embodiment, the slot may be defined in the tab with a slot-width of at least as great as a diameter of the cable and further defined with an elongated length of at least as great as two times the diameter of the cable. Accordingly, a fold of the cable may be passed through the slot for a short cable loop. A pad lock might then be passed around a strand of the cable associated with defining the loop so as to prevent withdrawal of the loop from the slot.

Figure 4A:
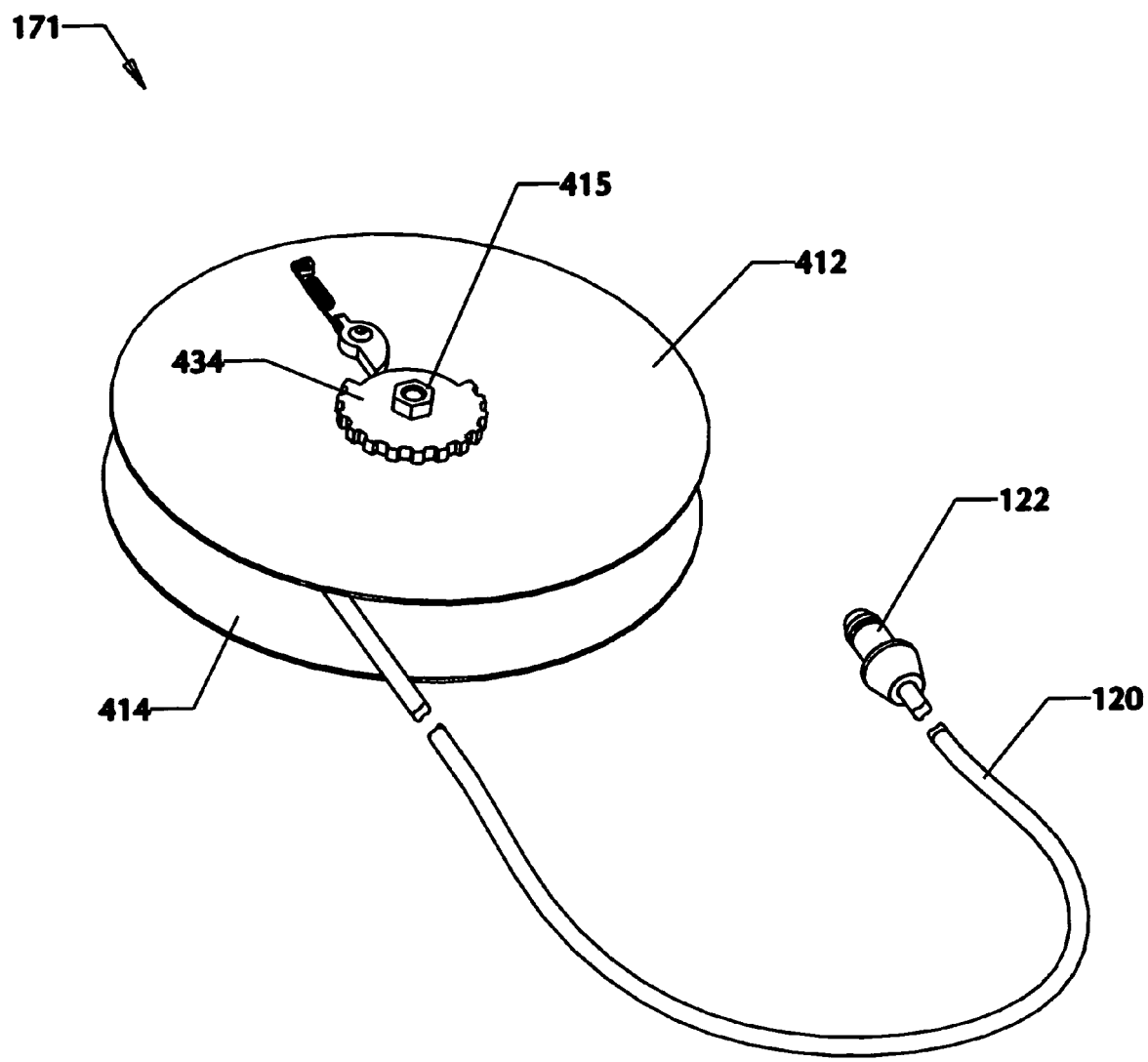
FIG. 4A is a perspective view of a cable reel that may be operatively coupled, consistent with some embodiments of the present invention, between interior walls of the lockbox of FIG. 1A, and showing the exterior of the reel and a cable wound around its inner core.
Figure 4B:
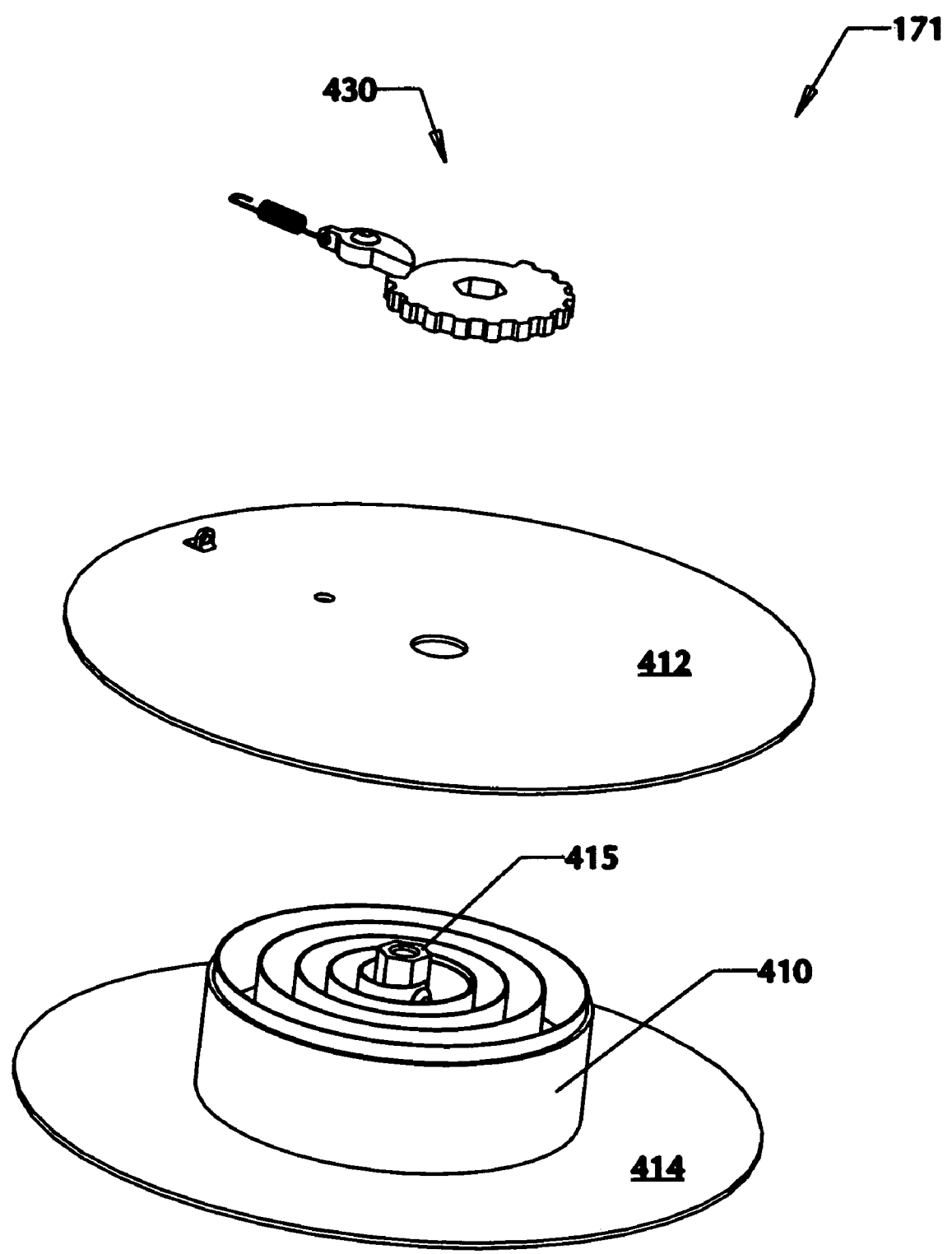
FIG. 4B is a perspective assembly view of a portion of the cable reel, showing a cable attachment mechanism that may form a portion of the reel, an inner coiling spring and a ratchet mechanism.
Figure 4C:
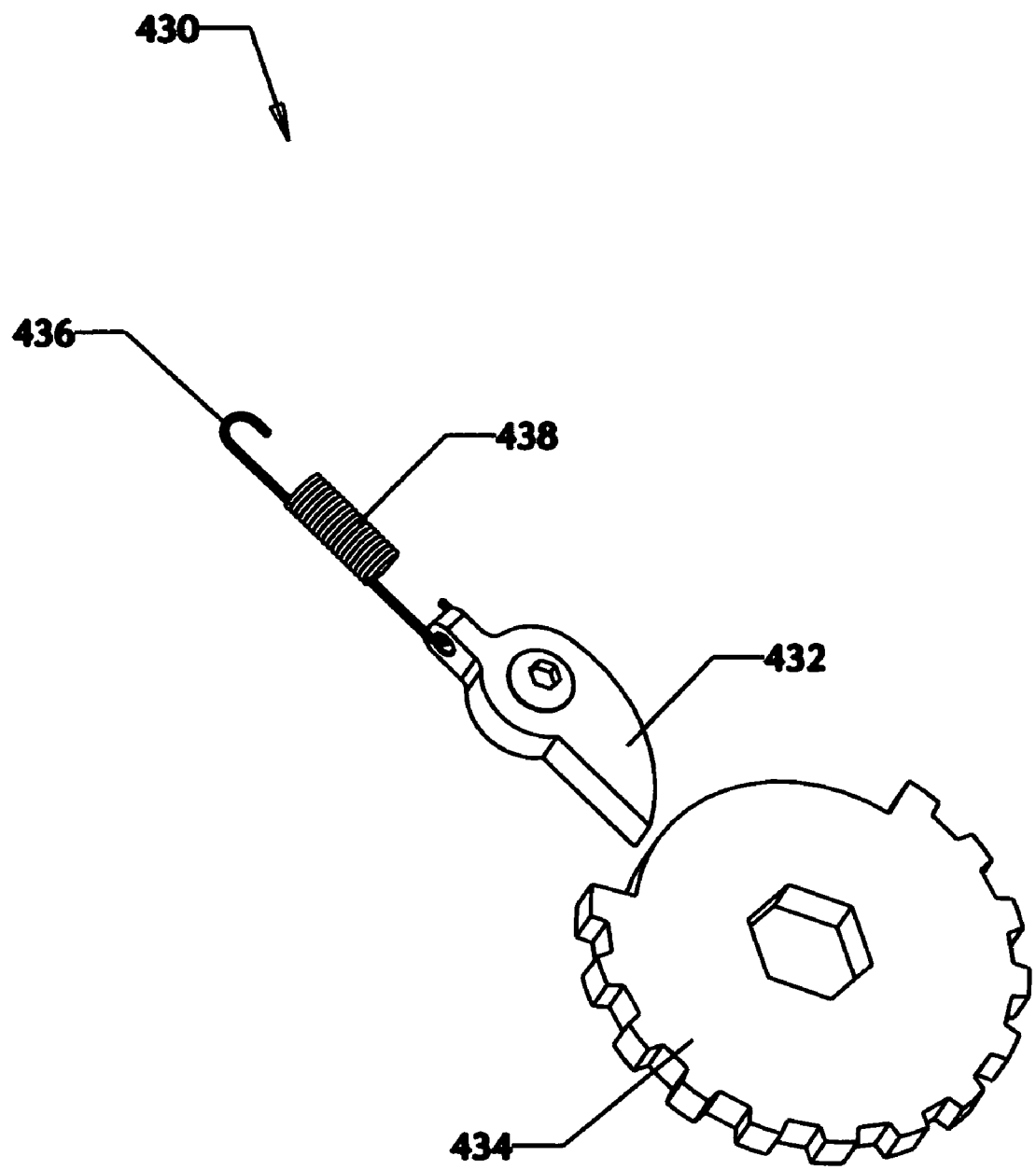
FIG. 4C is a more detailed perspective view of the cable ratchet mechanism that may form a portion of the reel assembly of FIG. 4A.
Figure 5A:
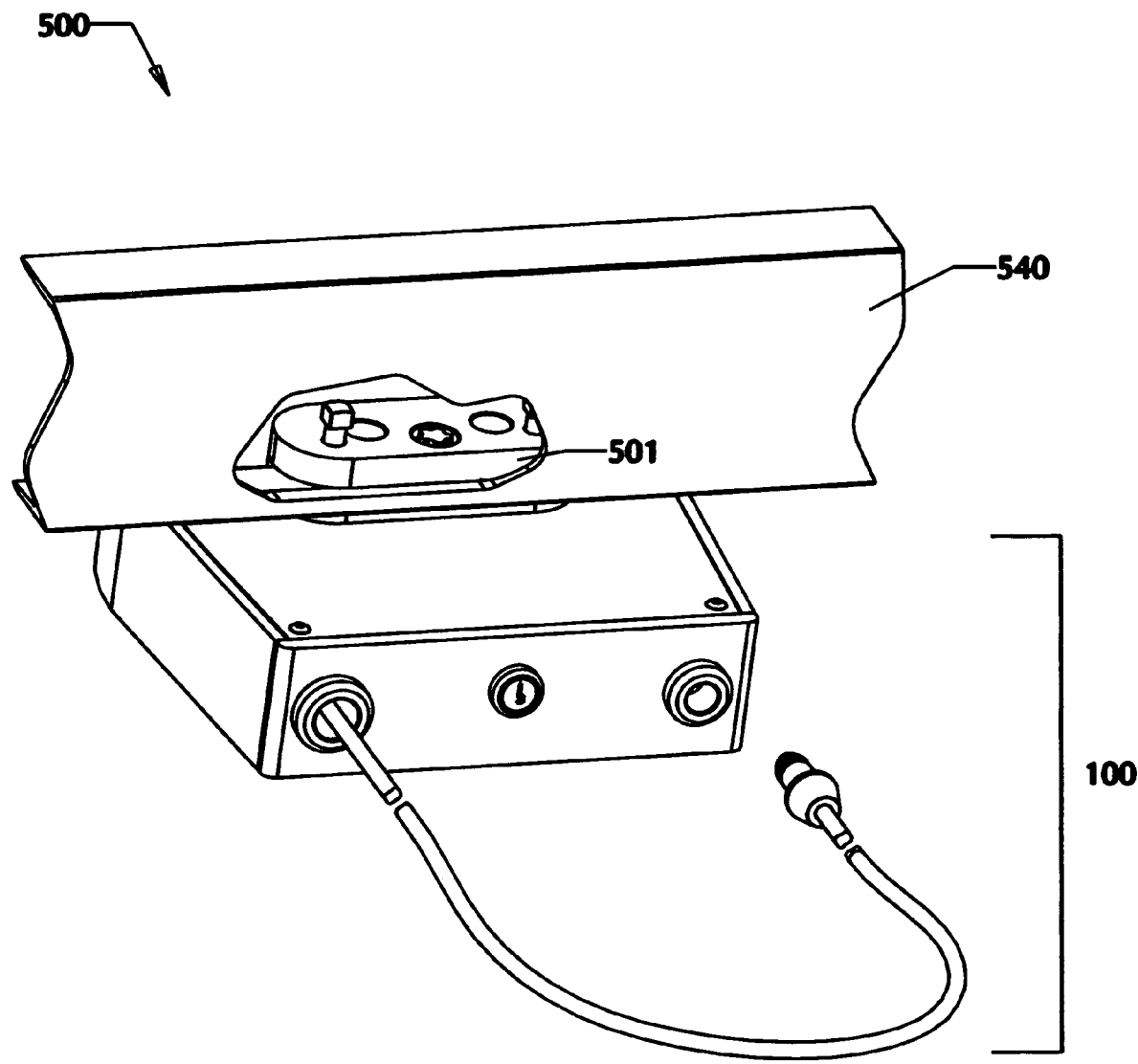
FIGS. 5A and 5B are perspective drawings of a c-shaped coupler operable to mount a lockbox to a flange of a c-channel beam of a vehicle, according to an embodiment of the present invention.
Figure 5B:
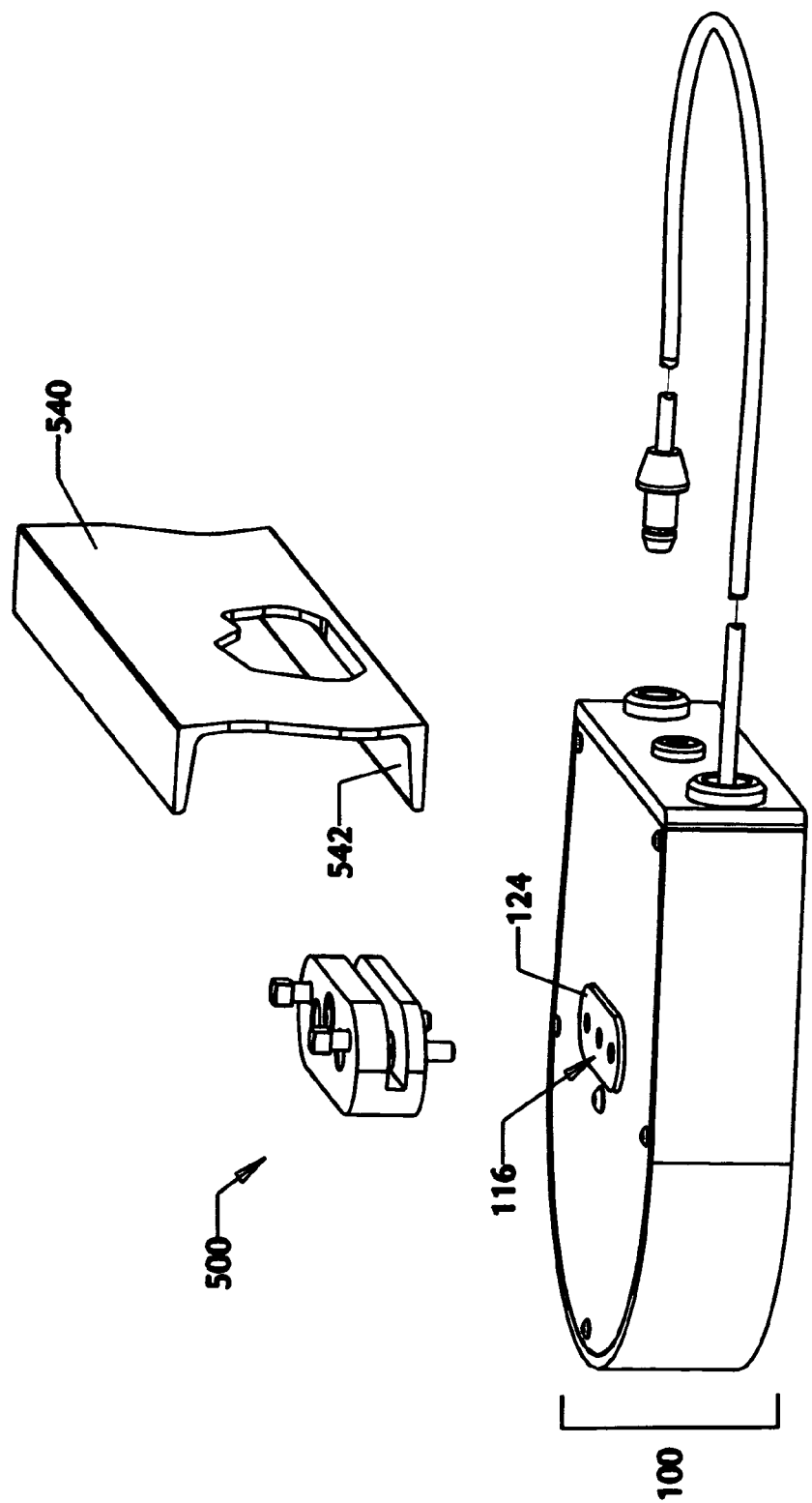

Continuing with reference to FIGS. 4A-4C, in some embodiments, lockbox 100/300 (FIGS. 1A/3) may comprise a reel assembly 171 (FIG. 4A) operable to secure and/or store cable 120. Although reel assembly 171 may take many forms, in some particular embodiments with reference to FIGS. 4A-4C, reel assembly 171 may comprise upper member 412 and lower member 414 defining, e.g., circular plates, substantially parallel to each other. The upper and lower members may be operatively coupled by a rotary core 415 operable together with a power spring/clock-type spring 410 to allow retrievable winding, tensioned unwinding and/or storing of cable 120 about the circumference of the inner core.

Referencing FIG. 4B, in particular embodiments, upper member 412 may comprise a ratchet mechanism 430 operable to release tensioning of user-controlled lengths of cable 120 as pulled through exit aperture 104. And, upon advancing to a neutral release circumference of the spindle wheel, the ratchet lock may be released to allow spring-operated rotational coil or recovery of the cable length. For example, spindle 434 may rotate counterclockwise when cable 120 is pulled on, or it may rotate clockwise to retract cable 120 once its outer circumference reaches a neutral position enabling release of ratcheting lever 432. Further referencing FIG. 4C, ratchet mechanism may allow the extension of cable 120 in uniform increments. Ratcheting lever 432, being biased by spring 438, may engage each slot position about the circumference of ratchet spindle 434 and likewise may be operable to maintain a given user-defined length of cable 120. That is, it may prevent retraction of the cable except in desired extracted cable increments. Upon disengagement about the ratchet spindle 434, providing clearance to ratchet lever 432, the ratchet-clip toggles counterclockwise under influence of spring 438 so as to release the reel. Accordingly, the recoiling power spring within the reel 171 may then act to retract the cable for recovering the external length. Further referencing FIG. 4C, ratchet lever 432 and biasing spring 438 both may be realized in other forms as a component of cable ratchet 430, collectively operable to assist retractable cable extension from storage housing of the lockbox. In alternative embodiments, the cable ratchet mechanism might also be located elsewhere on the reel assembly.

Referencing FIGS. 5A-B and 6A-C, consistent with one embodiment for another lock assembly 500, C-shaped coupler 501 may be described as an elongated U-bar comprising upper 612 and lower 614 lips that extend laterally outward from a sidewall 615 in spaced, substantially parallel relationship. The spacing 641 between the opposing upper and lower lips 612, 614 may be defined by the vertical height of the sidewall 615 and with a magnitude sufficient to allow receipt of, e.g., a flange member 542 therebetween. In a particular embodiment, the flange may be associated with, e.g., a frame member 540 of a vehicle. In this fashion, the C-shaped coupler 501 may be operable to slide onto flange 542 with its upper and lower lips 612, 614, respectively, about a mounting portion of the flange.

For example, a tongue of a utility trailer,—e.g., boat, camping or hauling trailer—may be defined in part by I-beams or C-beams that may meet near an end associated with a hitching unit. The C-shaped coupler 501 of this embodiment may then be fastened to a flange of one of these beam members that is associated with the vehicle as though a clam clamped with its upper and lower shells against opposite sides of the flange.

Further referencing FIGS. 5A-6C, to assist fastening and securing the C-shaped coupler 501 of this embodiment to lockbox 100 and the flange member 540, respectively, various screws and bolts 618A, 618B, 644, 646A, 646B may be used in combination with various alignments and tapped holes 603A, 603B, 608A, 608B, 602A, 602B, 604A, 604B in the coupler, in the flange member, and in the lockbox. In this embodiment, screws 618A, 618B associated with securing the coupler to the lockbox may be described as fasteners, a bolt 644 to lock the coupler to the flange may be described as a locking mechanism, and bolts/screws 646A, 646B to frictionally bind and clamp the coupler to the flange may be described as friction fasteners.

In a particular assembly, the "C" of the c-shaped coupler 501 may be clipped around flange 542 of frame member 540. Referencing FIGS. 6A-6C, a locking mechanism, e.g., locking bolts 644 with a keyed head that may fit through aligned holes 602A, 602B of the coupler and through a predefined hole in flange 542. In one example, locking bolt 644 may thread into tapped hole 602B in the lower lip 614 of the c-shaped coupler 510. In a further embodiment, it may thread into a tapped hole (102, FIG. 1) of the locking box. The receipt of a portion of flange 542 may render inaccessible fasteners 618A, 618B that fasten seating surface of coupler 501 to plateaued surface 116 of the protrusion 124 of lockbox 100/300 (FIGS. 1A/3). Additional friction fasteners/screws 646A, 646B may be threaded into holes 604A, 604B of the upper lip 612 of C-shaped coupler 501 for frictional or binding contact with the flange to prevent rotational or lateral movement of coupler 501 relative to flange 542.

In a further embodiment, further referencing FIGS. 5A-6C, the upper lip 612 of the coupler may define the upper hole 602A associated with the locking bolt 644 with a bored entry to a depth to define a recessed shoulder therefore (referencing the partial cut-away cross-sectional view of FIG. 6B) that may seat the lower surface of the keyed head for the bolt. Accordingly, when seated into the upper hole 602A, the head to the bolt may be recessed within the bored entry.

Figure 6A:
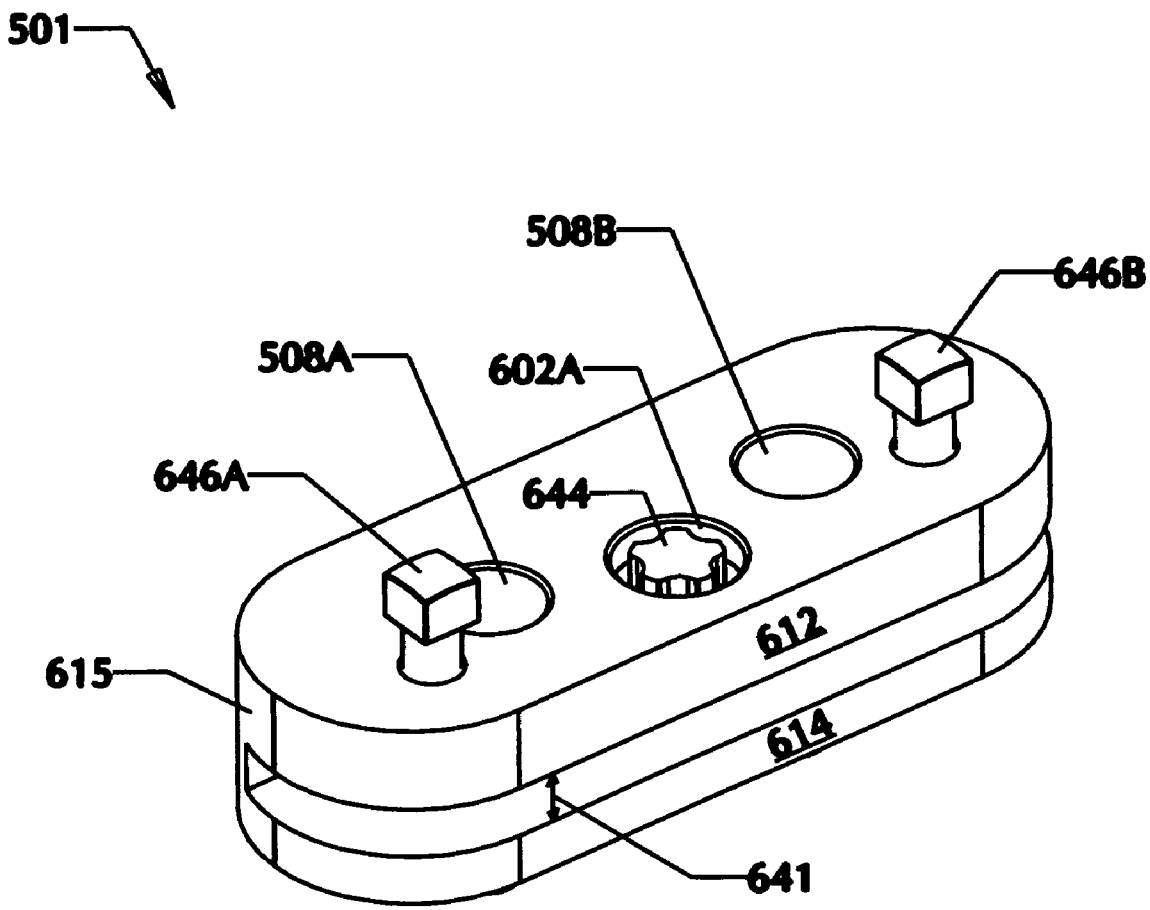
FIGS. 6A-6C are perspective, assembly and partial cutaway cross-sectional views of the c-shaped coupler, consistent with an embodiment of the present invention, showing provisions for a seating surface and a mounting mechanism.
Figure 6B:
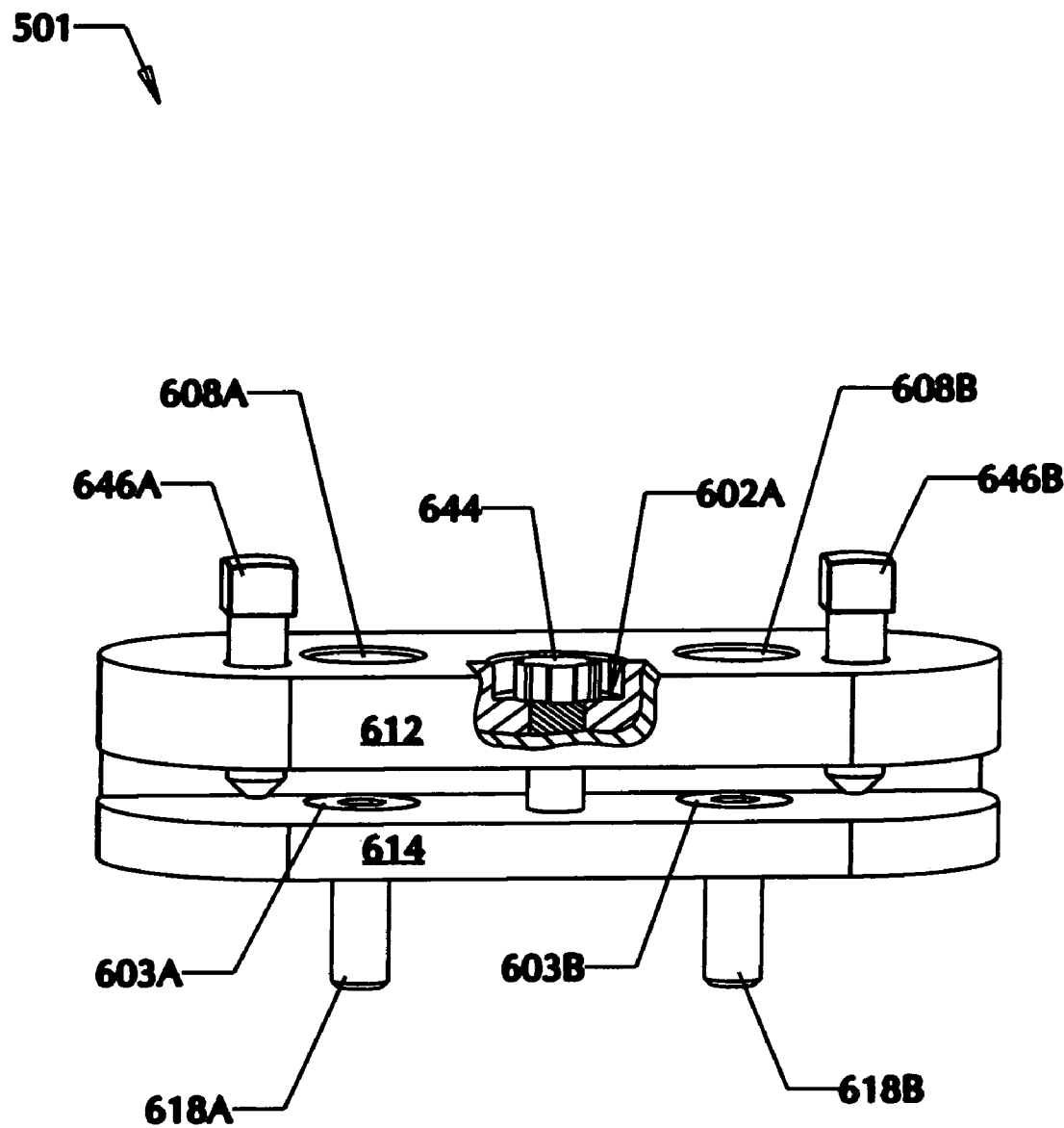
Figure 6C:
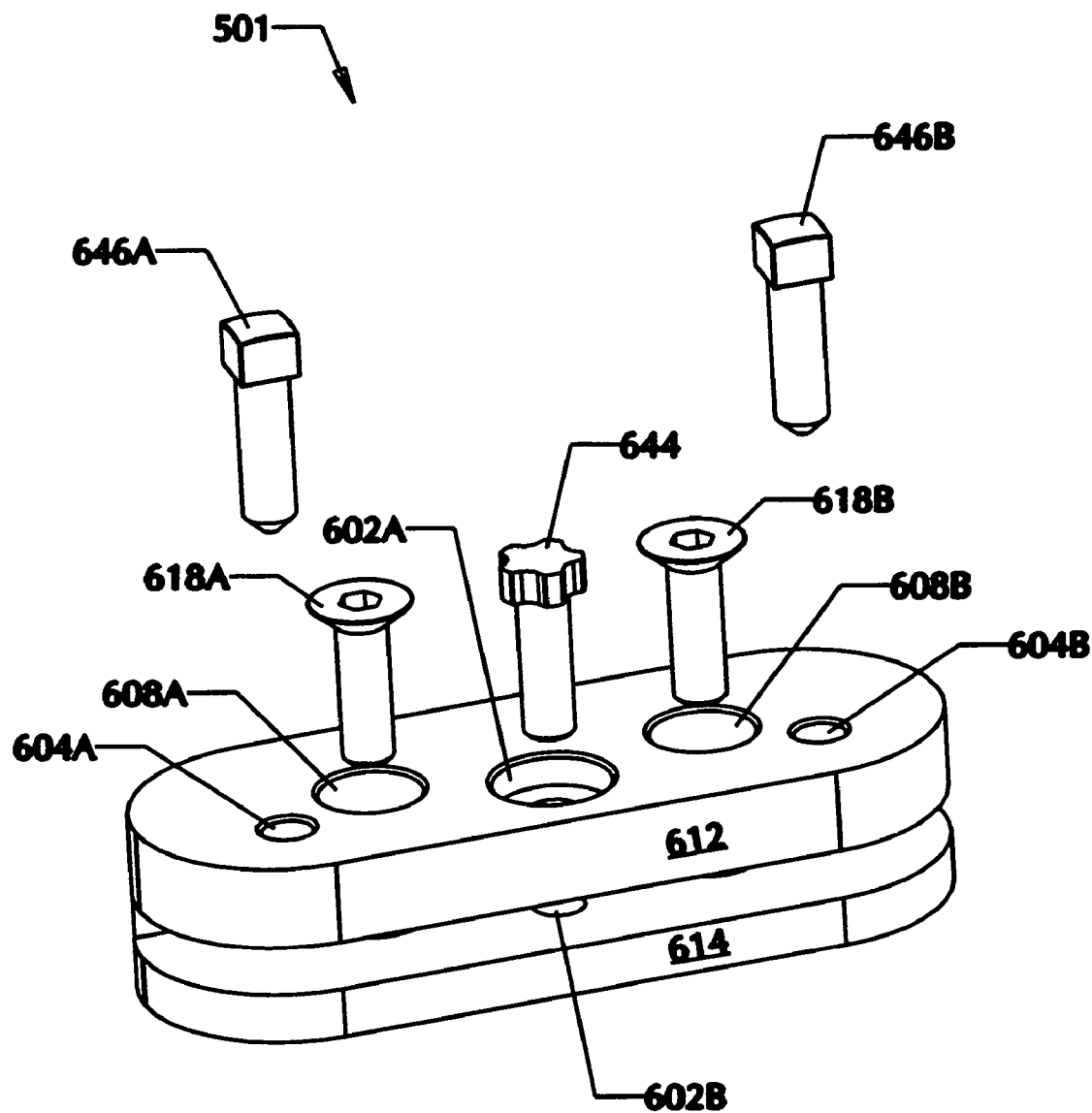
Figure 7A:
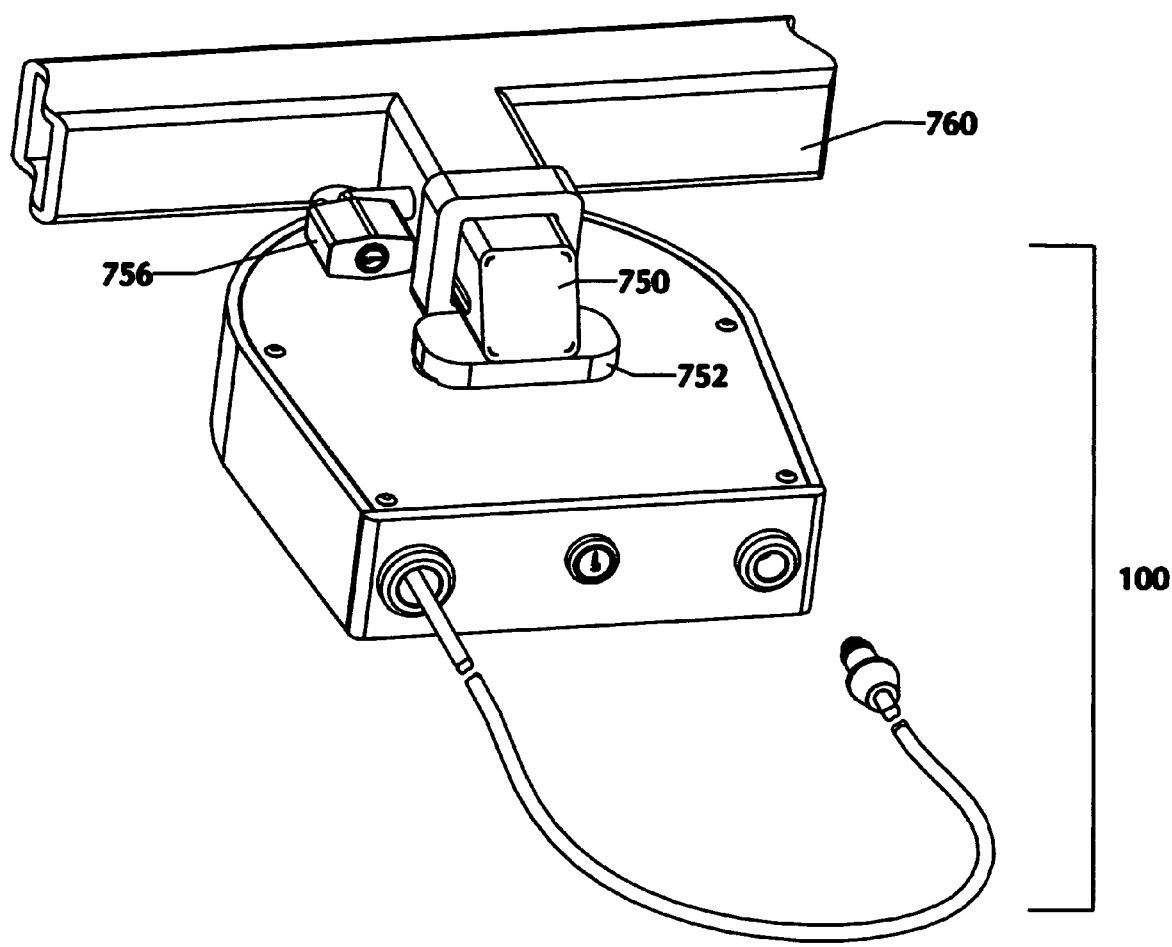
FIGS. 7A and 7B are simplified perspective and assembly views of another coupler, consistent with some embodiments of the present invention, operable to couple a lockbox to a receiver associated with a towing vehicle.
Figure 7B:
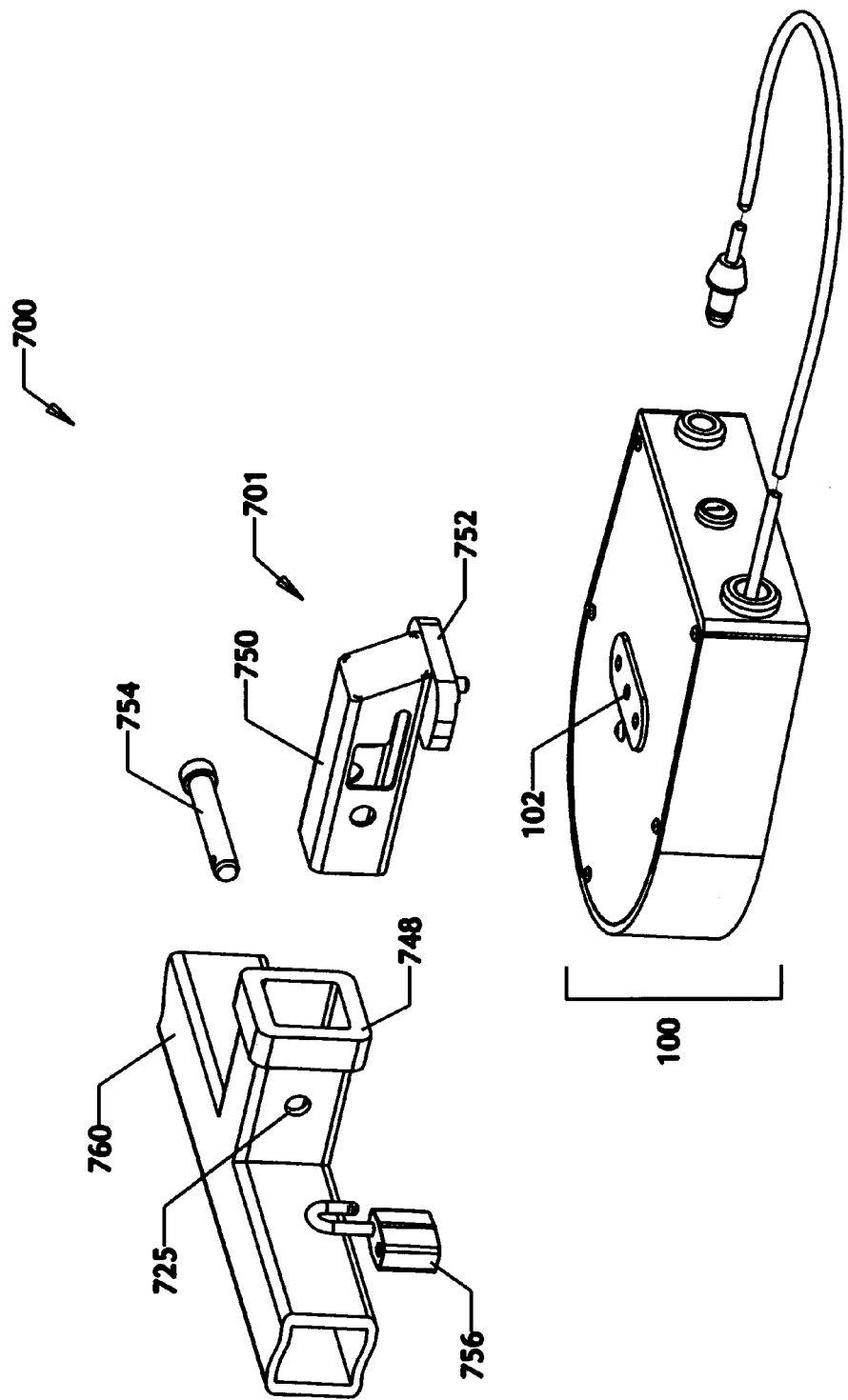

Further referencing FIGS. 6B, 6C, it may be understood that the lower holes 603A, 603B in the lower lip 614 of the coupler may be formed with a tapered entry to allow recess of a tapered head of fastening screws 618A, 618B when seated therein. Thus, the heads of these fastening screws, when fully seated n the holes, will not interfere with receipt of a flange between the upper and lower lips of the coupler. Further, it may be understood that the clearance holes 608A, 608B in upper lip 612 disposed over the lower holes 603A, 603B respectively, may be defined with diameters sufficient for allowing passage of fastening screws 618A, 618B together with an appropriate drive shaft (screw driver, allen wrench, positive-drive, etc.), so as to assist ease of assembly when fastening the coupler to the lockbox.

In other embodiments, referencing FIGS. 7A-8C, a lock assembly 700 may comprise a coupler 701 to mount a lockbox to a receiver 748 associated with a vehicle. Coupler 701 may comprise a square shaped tube 750 and a base plate 752 for engaging a lockbox (e.g., lockbox 100, FIG. 1A, lockbox 300, FIG. 3) to coupler 701. For mounting coupler 701 to a vehicle, the elongate square-shaped tube 750 defined by walls 814A-814D (FIG. 8C) may be inserted and fastened to a receiver hitch associated with a vehicle. That is, the periphery of the walls 814A-814D may fit the inner opening of such receiver. Two opposite walls 814C, 814D (FIG. 8C) may comprise, respectively, lock holes 823A, 823B that may further align with a pair of corresponding holes 725 (FIG. 7B) in the walls of receiver 748. Further, all the aligned holes may be shaped and positioned to allow insertion of a lock pole 754 (FIG. 7B) therethrough to fasten and/or lock the square shaped tuber 750 of coupler 701 within receiver 748.

In a particular embodiment, lock pole 754 may comprise an aperture to allow insertion of a lock 756 of any suitable type. Holes 823A, 823B, lock 756, and locking pole 754 may in combination be viewed as defining cooperatively at least a portion of a locking mechanism. Alternative locking mechanisms may be used (e.g., using differently positioned holes and different types or numbers of locking fasteners) as may be known in the art of hitching assemblies for securing tubular member 750 within receiver 748.

In a possible further embodiment, base plate 752 of the coupler may define a seating surface to assist stable annexation with a plateaued surface (e.g., surface 116 of FIG. 1A) defined by a protrusion of a lockbox. Further, base plate 752 may comprise a passage (not shown) operable to be aligned with a passage (not shown) in tubular member 750, which may further align with a corresponding hole (e.g., central hole 102, FIG. 7B) in the plateaued surface 116. The three aligned holes may, operable together, allow insertion of bolt 861 to fasten and/or secure coupler 701 to a lockbox (e.g., lockbox 100/300, FIGS. 1A, 3).

Figure 8A:
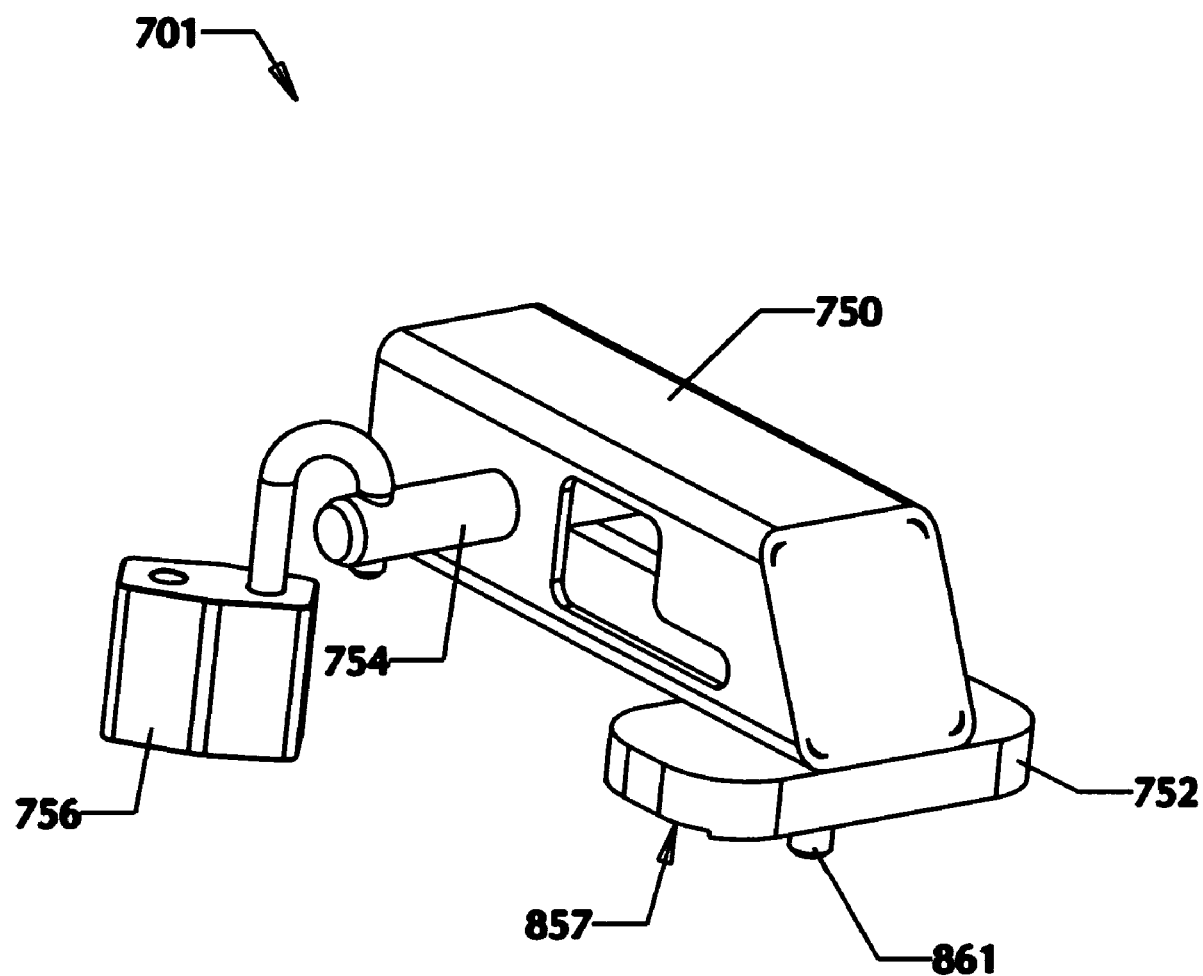
FIGS. 8A-8C are additional views of the coupler of FIGS. 7A and 7B, showing a chassis with a seating surface, a locking mechanism, and a mating mechanism of the coupler, operable together to secure a lockbox to a portion of a vehicle, according to an embodiment of the present invention.
Figure 8B:
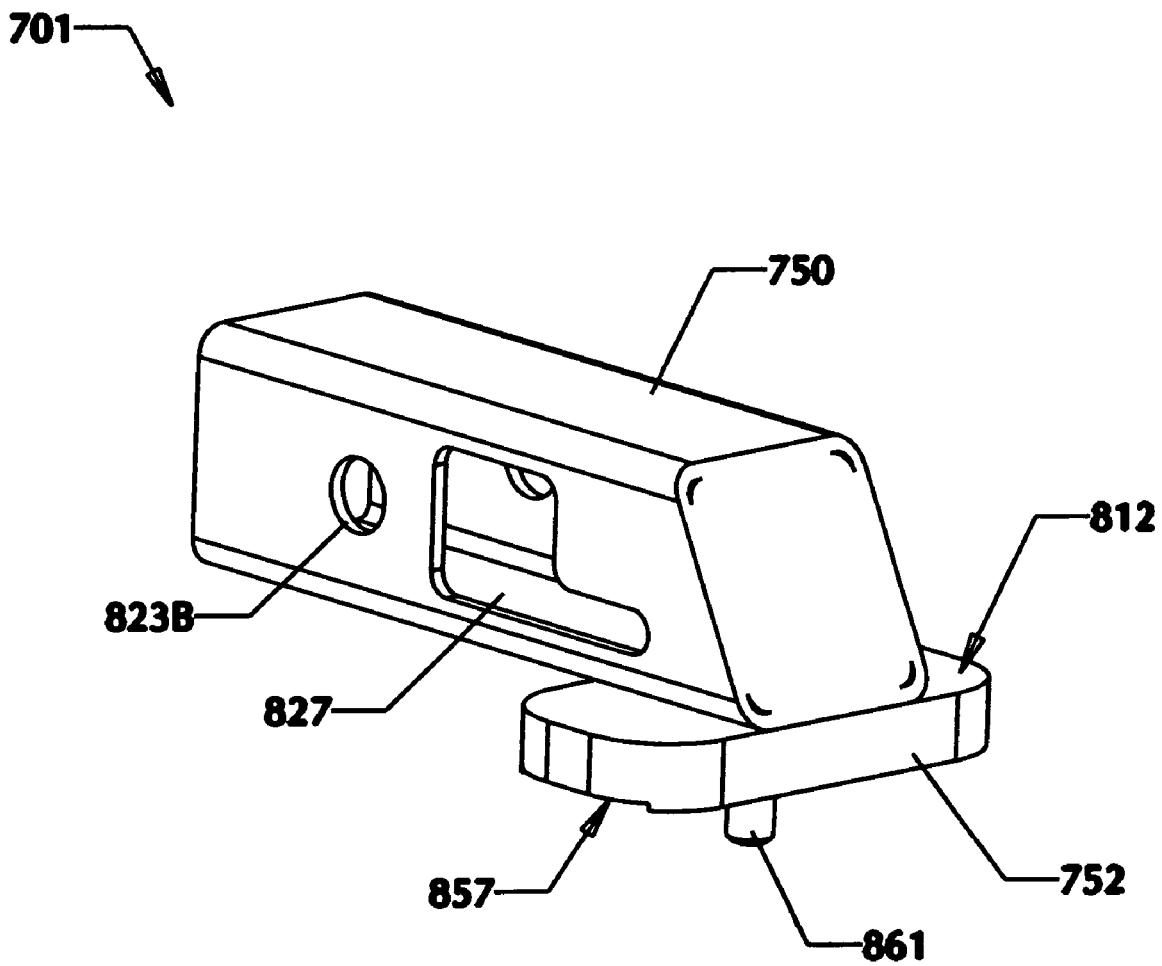
Figure 8C:
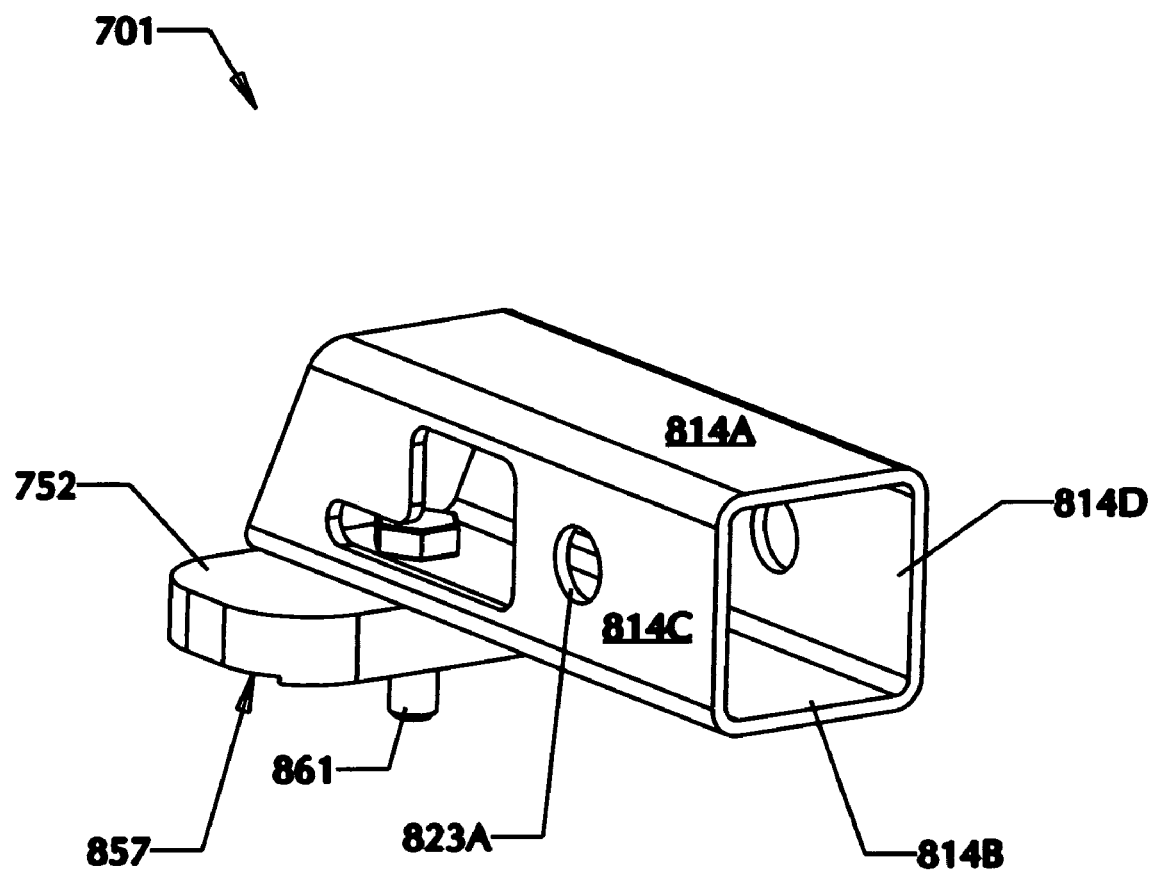
Figure 9A:
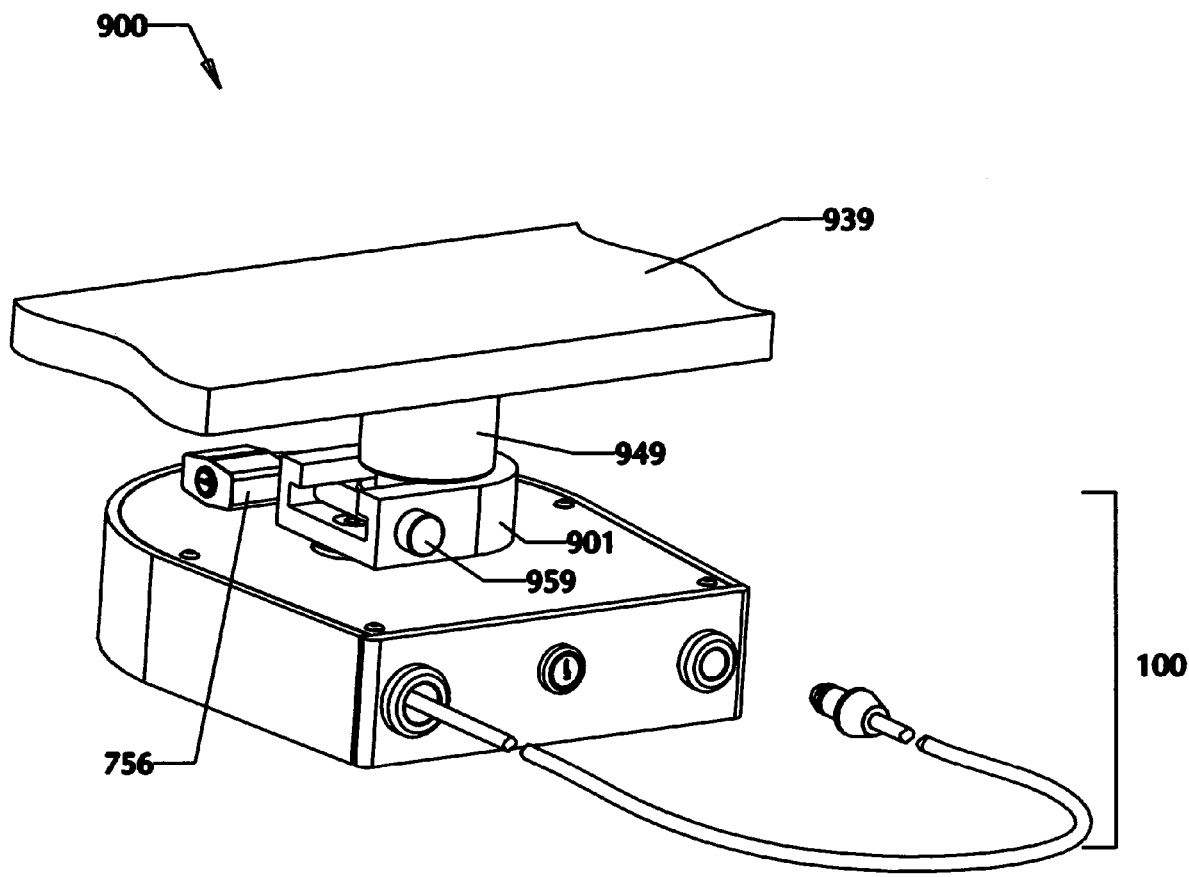
FIGS. 9A and 9B are simplified perspective and assembly views of another coupler, consistent with further embodiments of the present invention, operable to couple a lockbox to a locking pole associated with a fifth wheel trailer.
Figure 9B:
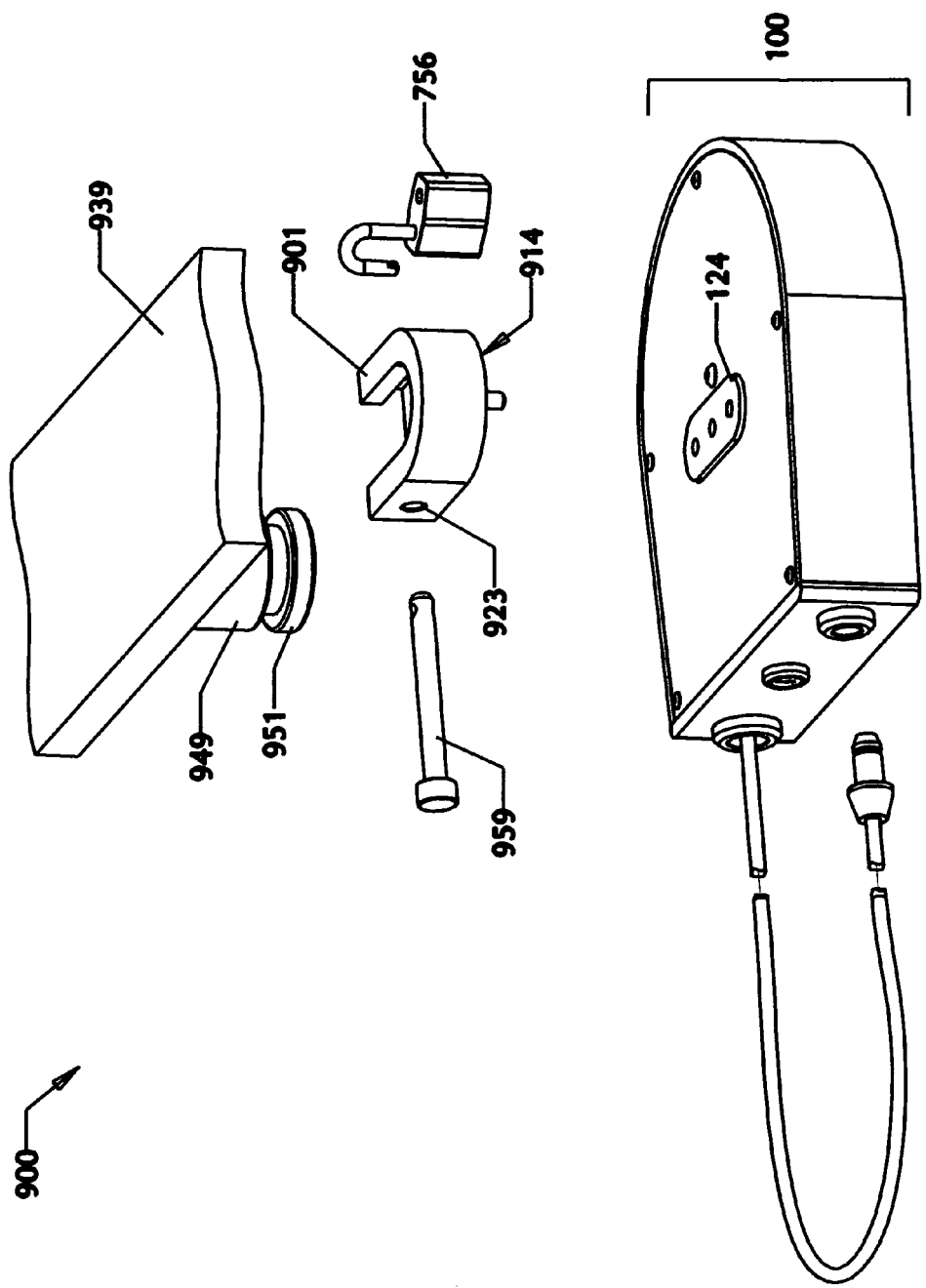

Referencing FIGS. 8A-8C, in some embodiments, sidewalls 814C, 814D of tubular member 750 may further comprise access opening(s) 827A (827B) for enabling access to the hollowed inner diameter of the tubular member 750. Access openings 827A, 827B may provide an access for enabling insertion of locking fastener 861 into the aligned passages through base plate 752 and into a tapped hole 102 of the lockbox 100/300. When tubular member 750 is within receiver 748, walls of the receiver may cover access holes to render fastener 861 inaccessible. As may be understood, the locking mechanism may further guard access to fastener 861, within lock pole 754 may first require unlocking for enabling release of the tubular member 750 to allow exposure of access openings through which the fastener 861 may be reached to enable decoupling of coupler 701 from the lockbox.

Referencing FIGS. 8A-8C, base plate 752 may comprise upper surface 812 and a seating surface that may define slot 857 to fit the periphery of a plateaued surface 116 of a protrusion 124 of the lockbox (e.g., lockbox 100/300, FIGS. 1A, 3). Again, a fastener 861 (e.g., bolt, locking bolt, lock pin etc.) and may extend through a passage defined through the base plate 752 and into the protrusion of the lockbox that defines the plateaued surface, which may be operable to bind these pieces together.

In a possible embodiment where base plate 752 and tubular member 750 may be cast or welded as a unitary structure, aligned holes therein may be a single passage in the structure and there may be no need to use a fastener to bind the base plate 752 to the tubular member 750. In such embodiments, the fastener through the single passage may instead bind the unitary structure of coupler 701 to lockbox 100/300.

Moving forward with reference to FIGS. 9A-10B, in another embodiment, a lock assembly 900 may comprise a U-shaped coupler 901 to mount a lockbox 100/300 to a lock pole 949 as may be associated with a fifth wheel trailer 939. In a particular embodiment, coupler 901 may comprise a lower portion 1014 and an upper portion 1012, which may be partially connected at their periphery by a sidewall 1015. Top member 1012 may define an inward shoulder 1063B operable together with lower member 1014 and sidewall 1015 to slot a flared end 951 to lock pole 949.

Lower member 1014 may comprise upper and lower surfaces, being substantially parallel to each other and substantially symmetrical about a central axis that may bisect both top and lower members. In some embodiments, the shoulder 1063B may further be captured within a slot or groove that may be defined coaxially around the bar of lock pole 949. This may further assist stable capture of the locking pole by coupler 901. Further, the bottom surface 914 (FIG. 9B) of the fifth wheel coupler 901 may be contoured to define the seating surface to seat the plateaued surface and outline defined by the protrusion 124 of the lockbox 100/300. This may serve to further stabilize the securement of the lockbox to the fifth wheel trailer. In other embodiments, bottom surface 914 may be flat but positioned to be attachable to the upper surface of the lockbox.

Partially connecting top member 1012 to lower member 1014, the U-shaped sidewall 1015 may, if examined per a cross-sectional view, comprise two opposing sidewall portions substantially symmetrical about the central axis. Further, the sidewall portions may respectively comprise aligned cross holes 923, opposite each other across the width defined by the upper/lower members and the sidewall. In yet a further embodiment, the sidewall holes may be substantially identical in size and shape, both parallel to upper surface 1016B of lower member 1014, and may be positioned to allow insertion of fastener 959 (e.g., lock pin, bolt, etc.) through the aligned holes.

Lock pole 949 may comprise a metal post (e.g., pole, cylinder, etc.) with a groove operable to interface fastener 959. Top member 1012, sidewall 1015, and bottom member 1014 may collectively be shaped to fit a partial periphery of lock pole 949 so that coupler 901 may be readily coupled to lock pole 949.

Figure 10A:
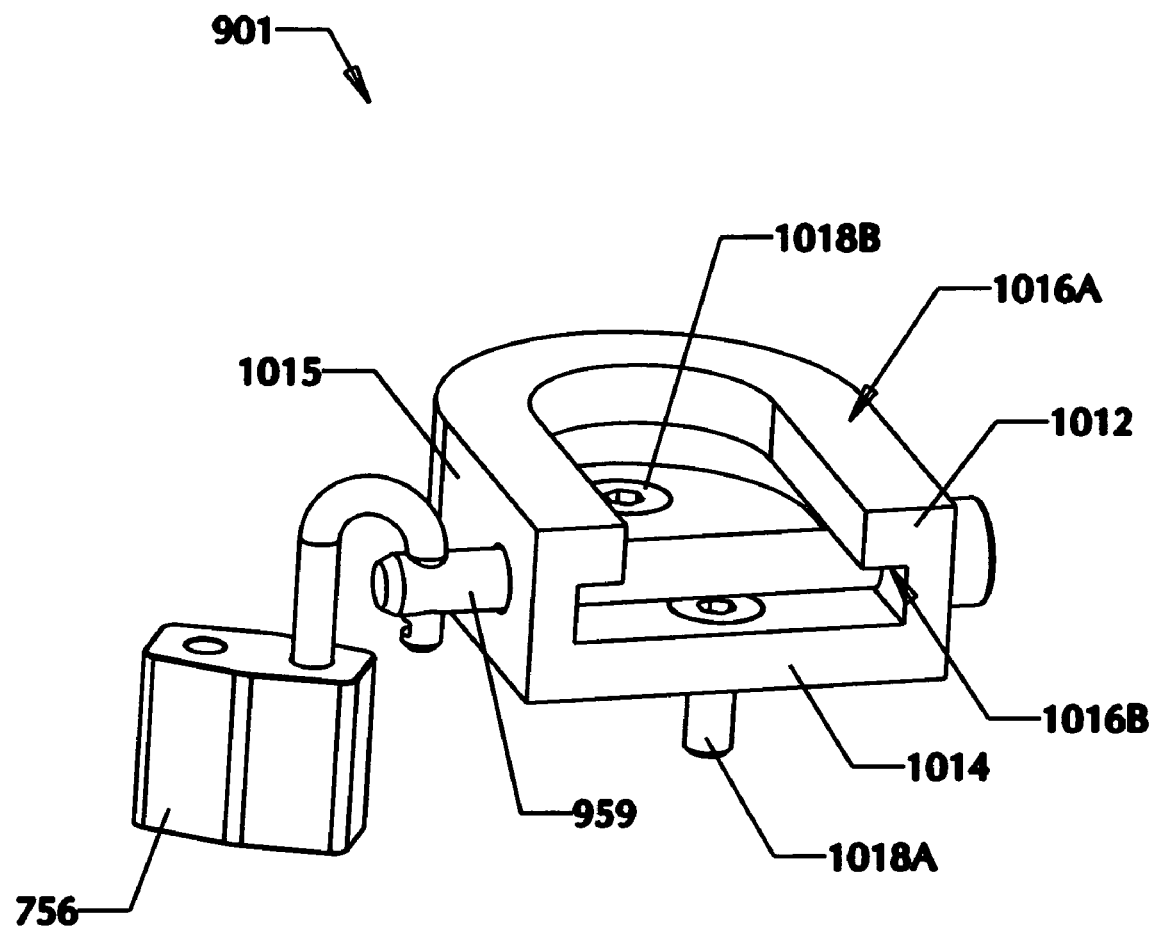
FIGS. 10A and 10B are additional perspective and assembly views of the coupler of FIGS. 9A and 9B, showing a locking mechanism and a mounting mechanism of the coupler.
Figure 10B:
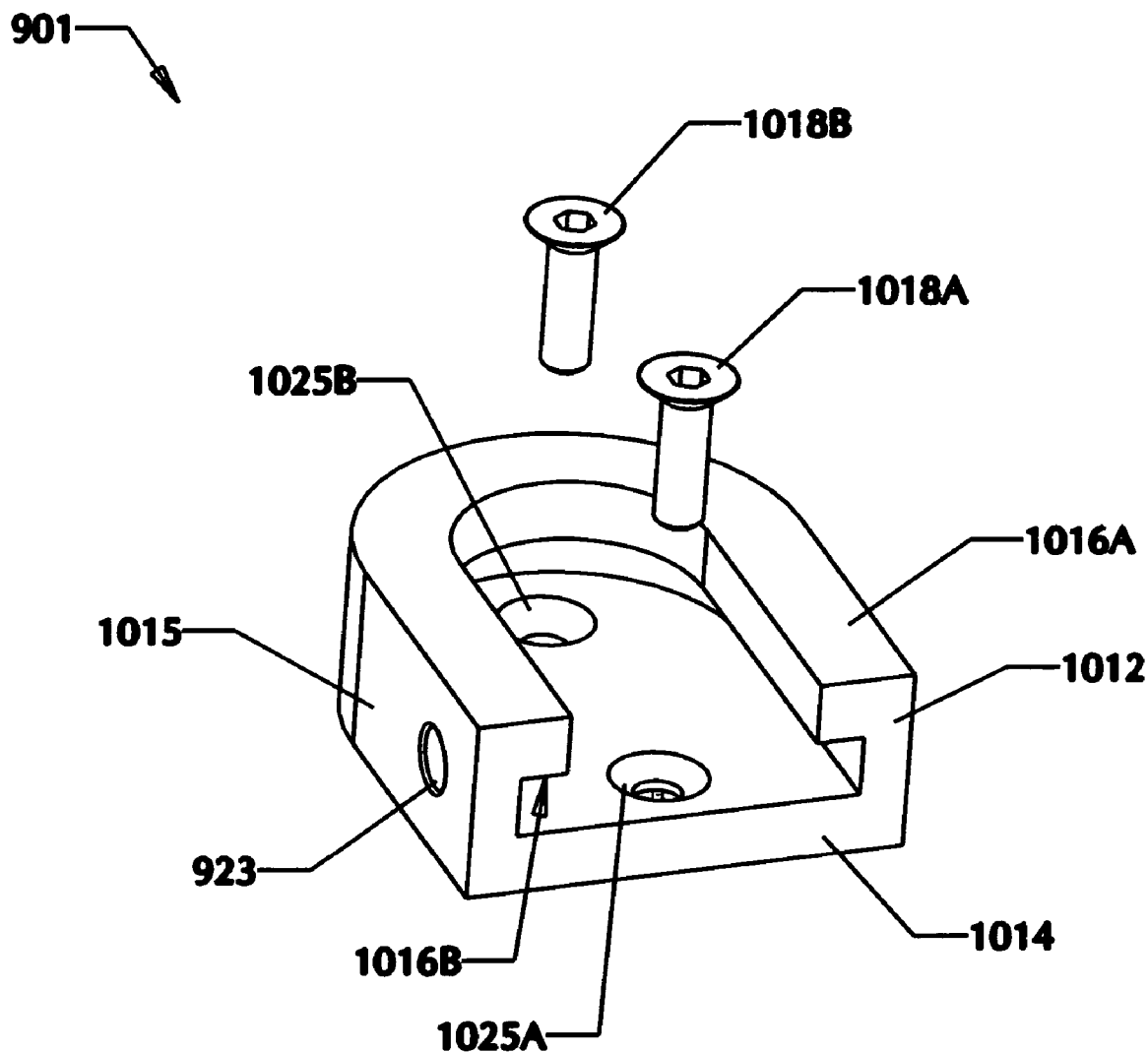
Figure 11A:
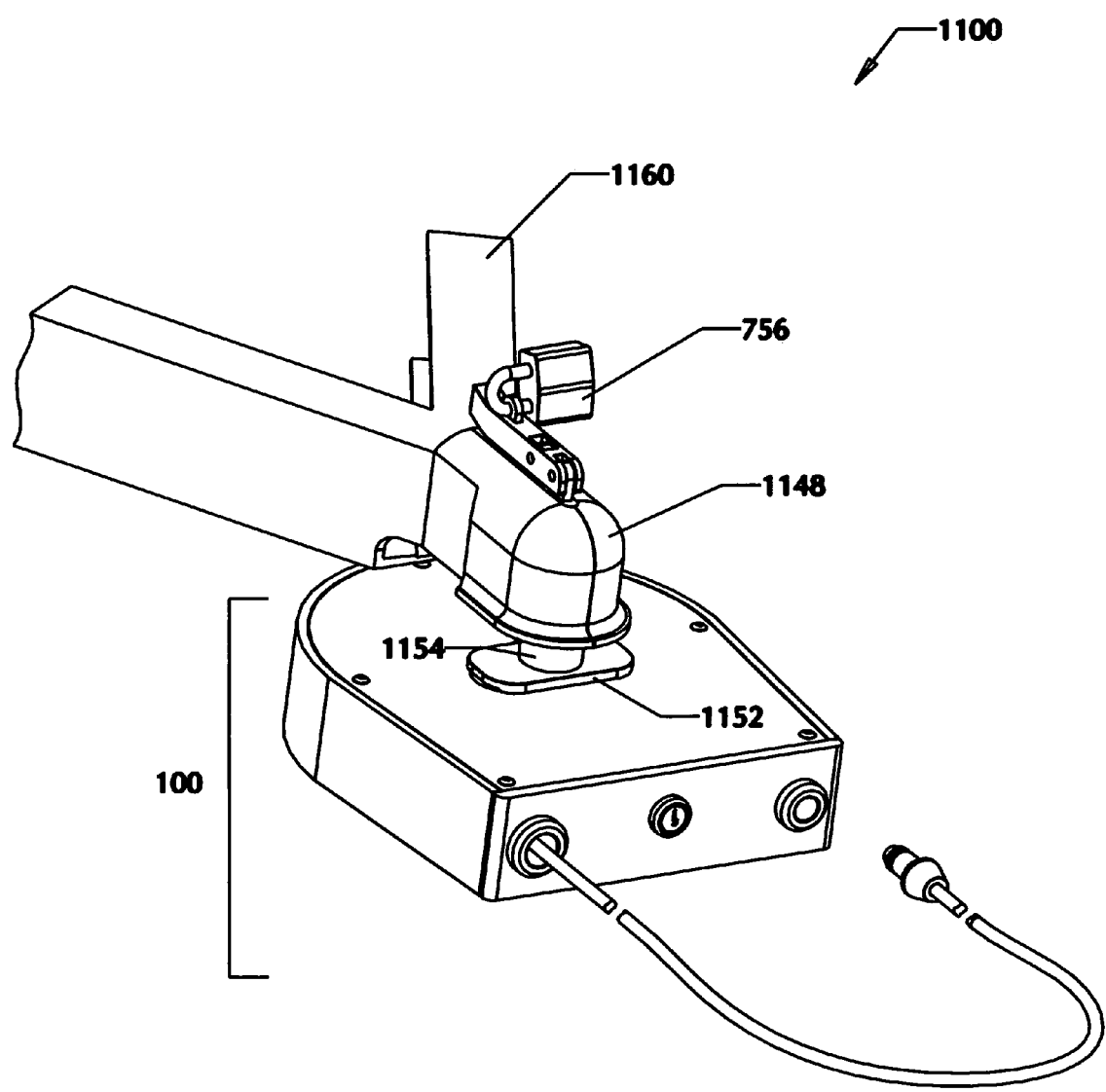
FIGS. 11A and 11B are simplified perspective and assembly drawings of yet another coupler, consistent with some embodiments of the present invention, operable to mount a lockbox to a trailer hitch.
Figure 11B:
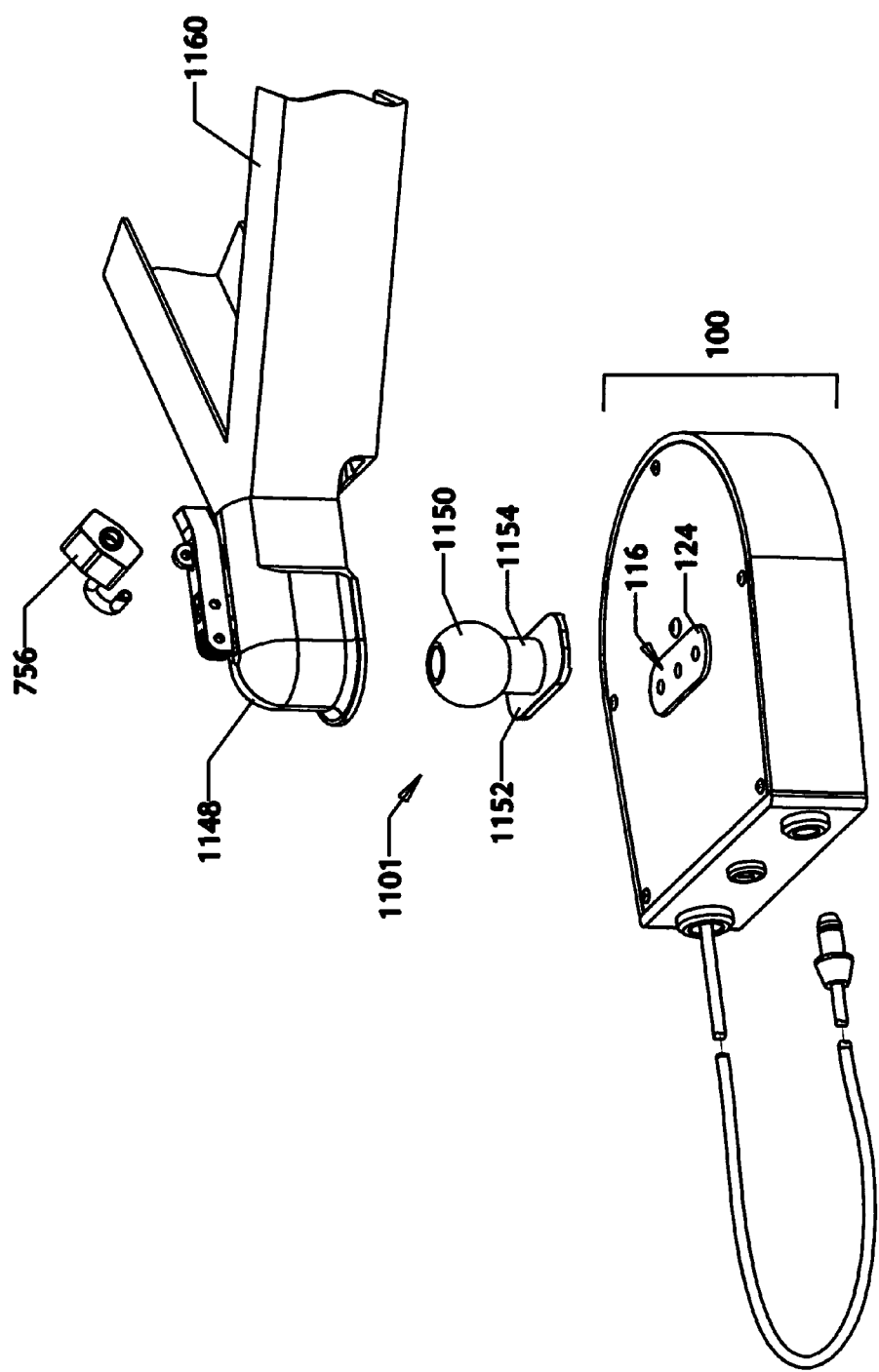

In some embodiments, referencing FIG. 10B, lockbox 100/300 may be locked to lock pole 949 by a locking mechanism, e.g., countersunk bolts 1018A, 1018B that may fit through holes 1025A, 1025B defined in lower member 1014 of coupler 901. Both countersunk holes may be substantially perpendicular to the upper surface of lower member 1014 and extending through its thickness. The pair of holes 1025A, 1025B may further align with holes 103A, 103B (FIGS. 1A/3) defined in plateaued surface 116 and operable together to allow insertion of the pair of countersunk bolts 1018A, 1018B. The presence of lock pole 949, fastener 959, and a lock (e.g., lock 756) of any suitable type may be operable to block access to the bolts and therefore block access to the fastening of the coupler to lockbox 100/300 without first unlocking and removing fastener 959 and then removing lock pole 949 from coupler 901.

The combination of countersunk holes 1025A/B in coupler 901, the center hole 102 (FIGS. 1A/3), and a pair of countersunk bolts therethrough may be described collectively as a locking mechanism. The combination of lock pole 949, sidewall holes 1025A/B, and lock pin 959 inserted therethrough may be described collectively as another locking mechanism.

In other embodiments of the present invention, referencing FIGS. 11A-12B, a lock assembly 1100 may comprise a ball coupler 1101 to mount a lockbox to a trailer hitch associated with a vehicle. Coupler 1101 may comprise a mating unit comprising a ball 1150 joined by an intermediate a cylindrical neck 1154 to a base plate 1152 in operation, referencing FIG. 11B, ball 1150 may be partially hemispherically secured within a ball receiving unit 1148 to, e.g., a trailer hitch, which may be operable to bind and/or lock coupler 1101 thereto. Further, ball 1150 may comprise an inner cylindrical passage 1264 that may extend therethrough. Passage 1264 may extend through both the ball 1150 and the cylindrical neck 1154 and may further align with passage 1266 defined in base plate 1152. The passages may be aligned to a tapped hole of the protrusion of the lockbox to allow insertion of a locking fastener 1261 (e.g., bolt, pin, etc.) to bind them together.

Figure 12A:
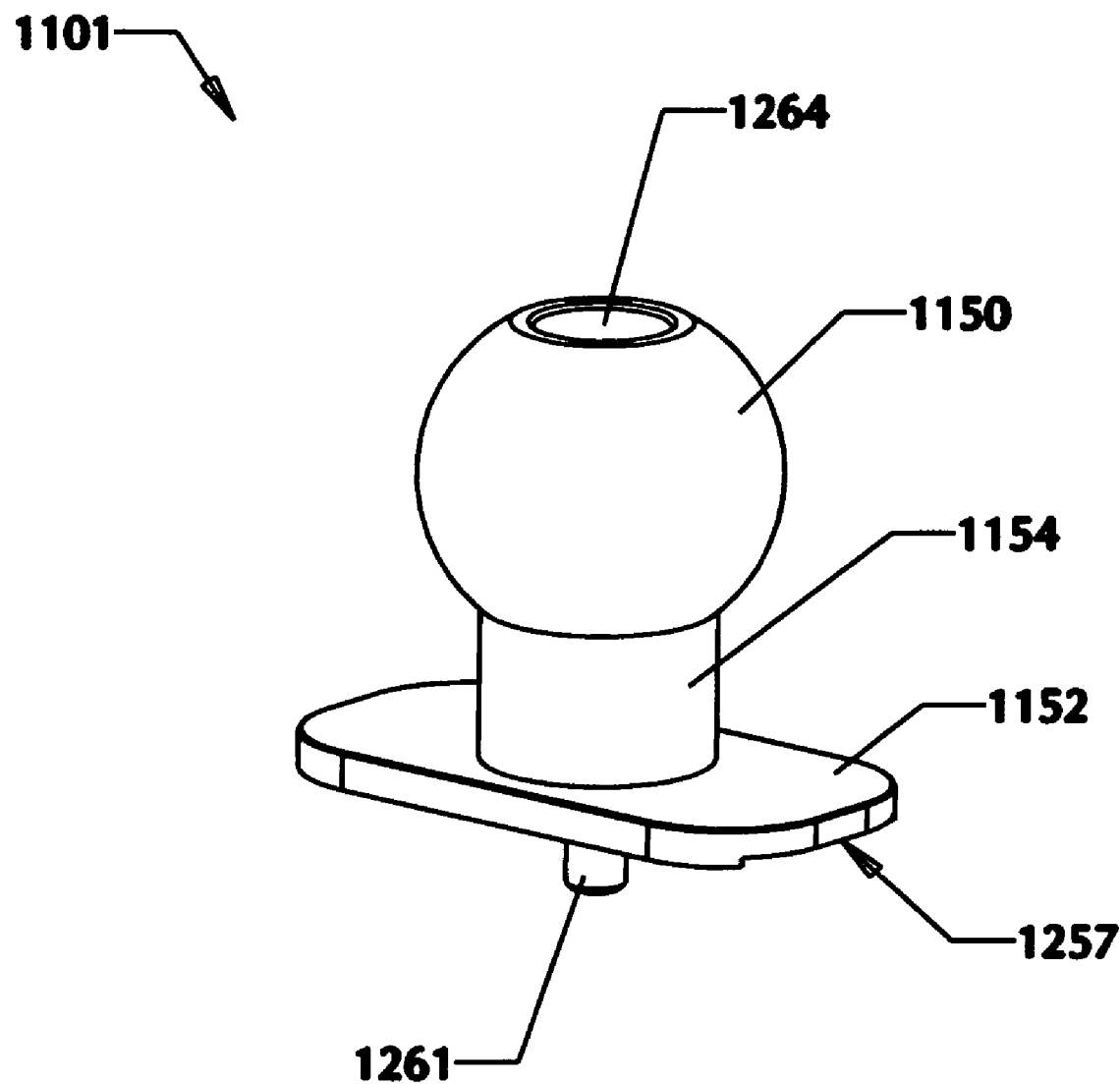
FIGS. 12A and 12B are additional perspective and assembly views of the coupler of FIGS. 11A and 11B, showing provision for a seating surface and a mounting mechanism defined in part by a base and a ball-shaped mating unit operable to be coupled to a receiving unit of a trailer hitch.
Figure 12B:
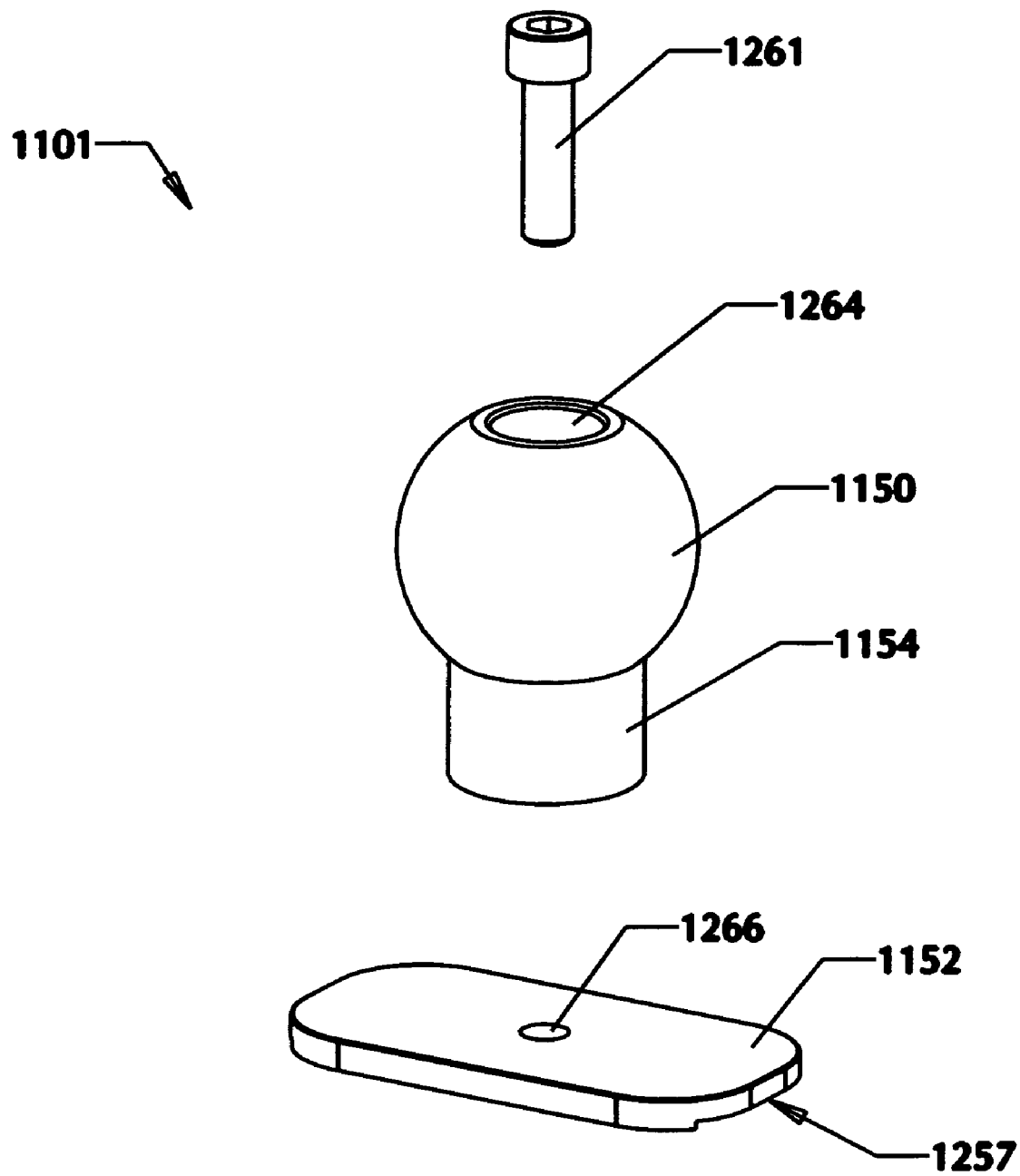

Further referencing FIGS. 12A, 12B, base plate 1152 may be similar to base plate 752 as described previously relative to FIGS. 8A-8C, and may comprise a seating surface to assist stable annexation with a plateaued surface 116 and otherwise may be defined by the protrusion 124 of lockbox 100/300. In some embodiments, the contoured seating surface may further assist alignment of the passage to the tapped hole in the plateaued surface 116. When so aligned, fastener 1261 may extend therethrough and tread within and/or secure coupler 1101 to the lockbox. In operation, ball 1150 may be inserted into ball receiving unit 1148 so that the presence of ball receiving unit 1148 may block access to fastener 1261. Further, ball receiving unit 1148 may comprise a lock mechanism (e.g., a hinge, a shackle, etc) operable to receive a lock (e.g., lock 756) of any suitable type to make fastener 1261 further inaccessible and the lockbox irremovable without first unlocking the lock unit and detaching coupler 1101 from trailer hitch 1160.

In a particular embodiment, ball 1150, cylindrical neck 1154, and base plate 1154 may define a unitary coupling structure, while in other embodiments they may be separate members removably affixed together to form a ball-hitch coupler.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such modifications and changes do not depart from the true spirit and scope of the present invention as may be set forth in the following claims.

What is claimed is:

1. A vehicle mountable personal property lock assembly comprising:
   a housing defined in part by a plurality of walls;
   a coupler comprising a seating surface seated in abutted disposition against a given wall of the plurality, the coupler further comprising a mounting mechanism operable to mount to a portion of a vehicle;
   a fastener removably securing the coupler to the housing with the seating surface of the coupler against the given wall;
   the mounting mechanism of the coupler operable together with the portion of the vehicle, when mounted thereto, to block user access to the fastener;
   a reel axially secured to at least one of the plurality walls for operable rotation within the interior of the housing;

a cable having first and second ends, wherein the first end of the cable is secured to the reel and the reel is operable by rotation to enable winding/unwinding of a length of the cable; and a sidewall of the plurality of walls for the housing defining a cable exit orifice, the cable passably threaded through the cable exit orifice;

in which the second end of the cable comprises a cable retention knob having an external surface that defines a shaft;

a cable receiving mechanism disposed on an external wall of the plurality for the housing, the cable receiving mechanism configured to enable an operator to removably lock thereto the second end of the cable opposite the first end; and the cable retention knob further comprises a butt-end joining the cable with an angled flare-out to seat with non-binding engagement within a tapered opening defined by the cable exit orifice.

2. The lock assembly of claim 1, in which the cable receiving mechanism comprises a U-bar extending outwardly from the external wall to define a receiving slot; and the shaft for the distal end of the second end of the cable further defines a slot operable in cooperation with a locking mechanism to enable capture of the cable retention knob relative to the u-bar.

3. A vehicle mountable personal property lock assembly comprising:

a housing defined in part by a plurality of walls;

a coupler comprising a seating surface seated in abutted disposition against a given wall of the plurality, the coupler further comprising a mounting mechanism operable to mount to a portion of a vehicle;

a fastener removably securing the coupler to the housing with the seating surface of the coupler against the given wall;

the mounting mechanism of the coupler operable together with the portion of the vehicle, when mounted thereto, to block user access to the fastener;

a reel axially secured to at least one of the plurality walls for operable rotation within the interior of the housing;

a cable having first and second ends, wherein the first end of the cable is secured to the reel and the reel is operable by rotation to enable winding/unwinding of a length of the cable;

a sidewall of the plurality of walls for the housing defines a cable exit orifice, the cable passably threaded through the cable exit orifice; and a cable receiving mechanism disposed on an external wall of the plurality for the housing, the cable receiving mechanism forming at least in part a U-bar that extends outwardly from the external wall to define a receiving slot operable to enable an operator to removably lock thereto the second end of the cable opposite the first end, the U-bar fixedly disposed on the exterior wall by at least one of welding, bolting or integral casting with the exterior wall;

in which the given wall of the plurality for the housing defines a plateaued surface with a tapped hole along an axis extending inwardly to the housing and substantially perpendicularly to the plateaued surface;

the coupler further defines an orifice that extends therethrough;

the seating surface of the coupler forms one of a flat or contour operable to seat in abutting disposition upon the plateaued surface of the given wall and when so seated is further operable to obtain substantial axial alignment of the orifice of the coupler relative the tapped hole of the plateaued surface of the given wall;

the fastener comprises at least one bolt extending through the orifice(s) of the coupler and secured into the respective tapped hole(s) of the plateaued surface to assist the alignment and fastening of the coupler to the plateaued surface with the seating surface of the coupler against the plateaued surface; and the plateaued surface is defined in part by a plateauing plate removably affixed to an external surface of the given wall.

4. A vehicle mountable personal property lock assembly comprising:

a housing defined in part by a plurality of walls;

a coupler comprising a seating surface seated in abutted disposition against a given wall of the plurality, the coupler further comprising a mounting mechanism operable to mount to a portion of a vehicle;

a fastener securing the coupler to the housing with the seating surface of the coupler against the given wall;

the mounting mechanism of the coupler configured to be operable together with the portion of the vehicle, when mounted thereto, to block user access to the fastener;

a reel axially secured to at least one of the plurality walls for operable rotation within the interior of the housing;

a cable having first and second ends, wherein the first end of the cable is secured to the reel and the reel is operable by rotation to enable winding/unwinding of a length of the cable; and a sidewall of the plurality of walls for the housing defining a cable exit orifice, the cable passably threaded through the cable exit orifice;

in which the coupler comprises:

a bottom plate portion defined at least in part by upper and lower surfaces, the lower surface to define at least in part the seating surface;

a top portion forming a horse-shoe shape, per a planar view, for at least a partial circumference;

a lower surface of the top portion for the horse-shoe shape being at least partially connected to the upper surface of the bottom plate portion by sidewalls extending therebetween and along the partial circumference associated with the horse-shoe shape, the sidewalls and the top portion collectively defining an annular flange directed radially inward along the partial circumference for the horse-shoe shape;

the bottom plate portion in cooperation with the sidewalls and the annular flange formed for the horse-shoe shape of the top portion defining the mounting mechanism for the coupler as a grooved cup-shape with a side-access operable to enable grooved or slotted receipt of and fit around a partial periphery of at least a lower portion of a locking pole associated with a fifth wheel trailer.

5. The lock assembly of claim 4, wherein the sidewalls associated with defining in part the cup-shape for the mounting mechanism of the coupler further define a pair of holes, the holes to the pair disposed at locations of the sidewalls to oppose one another across the side-access for the cup-shape and distal the heel of the cup-shape, the opposing holes in the sidewalls of the mounting mechanism aligned to enable receipt of a lock pin therethrough and across the side-access to be operable for operability in cooperation with the mounting mechanism to enable capture of the lower knob portion of the locking pole of the fifth wheel trailer when seated within the cup-shape.

6. A vehicle mountable personal property lock assembly comprising:
- a housing defined in part by a plurality of walls;
- a coupler comprising a seating surface seated in abutted disposition against a given wall of the plurality, the coupler further comprising a mounting mechanism operable to mount to a portion of a vehicle;
- a fastener removably securing the coupler to the housing with the seating surface of the coupler against the given wall;
- the mounting mechanism of the coupler configured to be operable together with the portion of the vehicle, when mounted thereto, to block user access to the fastener;
- a reel axially secured to at least one of the plurality walls for operable rotation within the interior of the housing;
- a cable having first and second ends, wherein the first end of the cable is secured to the reel and the reel is operable by rotation to enable winding/unwinding of a length of the cable; and
- a sidewall of the plurality of walls for the housing defining a cable exit orifice, the cable passably threaded through the cable exit orifice;
- wherein the cable receiving mechanism is defined by a U-bar extending outwardly from the external wall to define a receiving slot, the u-bar affixed onto the exterior wall as a single unit with the housing; and
- the second end of the cable comprises a mating head having a distal end defining a slot passing therethrough, the slot defined with a width and length to allow insertion of an arm of a lock for enabling operable securement of the second end relative to the u-bar.

7. A property securement device mountable to a vehicle to assist security of property thereto, the property securement device comprising:
- walls defining a housing with an exit orifice, at least one of the walls forming a structure operable at least in part to enable anchoring of the housing to at least one of a frame member, a hitch receiver, a ball-hitch, lock-pole/king-pin and a chassis of a vehicle;
- a locking mechanism disposed on a wall of the housing;
- a reel operably secured for rotation within the housing;
- a cable comprising a first end fixed to the reel, a second end opposite the first end and a length defined between the first end and the second end that passes through the exit orifice;
- a cable retention knob disposed on the second end of the cable external the housing and comprising a distal portion cooperatively operable with at least part of the locking mechanism for enabling securement of the cable retention knob relative to the locking mechanism;
- a power spring to apply a rotational force on the reel to enable retrievable winding and tensioned unwinding of the cable about an inner core of the reel; and
- a ratchet mechanism operable in cooperative configuration with the reel to enable release of tension on the cable at given incremental extractions of the cable from the housing;
- the ratchet mechanism further operable in cooperative configuration with the reel to provide neutral zones along substantially periodic intervals of the cable extension, wherein an interval for one of the neutral zones is defined by multiple of said given incremental extractions, the ratchet mechanism further operable collectively with the reel when within a given neutral zone to free the reel and permit reversal of reel rotation with tension applied to the cable for retraction under the influence of the power spring.

8. The device of claim 7, in which a wall of the housing defines the exit orifice with a flare-out along at least a portion of its passage by which to seat a tapered shoulder of the cable retention knob.

9. The device of claim 8, wherein the tapered shoulder of the cable retention knob is shaped to removably seat within the flare-out of the exit orifice when the cable is retrieved and wound about the reel with under tension for storage within the housing; and
- the power spring comprises a bias for the rotational force to the wheel of magnitude sufficient to seat the tapered shoulder of the cable retention knob within the flare-out of the orifice when the cable is retrieved.

10. The device of claim 7, in which the reel comprises upper and lower plates sandwiching the inner core therebetween; and
- the ratchet mechanism comprises:
  - a gear wheel formed at least in part by one of the upper plate and the lower plate, the gear wheel having a circumference that comprises a first arc-length defined by a first radius through multiple angular increments between respective plurality of peripheral notches of second radius slightly less than the first radius, wherein the multiple angular increments and the plurality of peripheral notches extend through the first arc-length of the circumference, the circumference further comprising a second arc-length defined by a third radius less than the second radius through a given angular extend for the neutral zone, the second arc-length for the neutral zone is of an angular continuum about the circumference that is outside that for the first arc-length; and
  - a ratchet lever biased to pivotally press against portions of the gear wheel of the first and second radius to the first arc-length of the circumference during rotation of the reel for extraction of the cable, and operatively configured to prevent rotation of the reel in a the reverse direction when capturing a notch of the gear wheel upon ceasing cable extraction with the reel rotation presenting the first arc-length portion of the circumference to the ratchet lever;
- the third radius of the neutral zone of the gear wheel of magnitude sufficiently less than the first and second radius to enable pivotal clearance of the ratchet lever when it is disposed therein and to enable a change in the direction of rotation of the reel upon ceasing cable extraction with the reel rotation presenting the first arc-length portion of the circumference to the ratchet lever.

11. The device of claim 7, in which the distal portion of the cable retention knob defines an aperture therethrough having a width sufficient to receive an arm or shank of a locking means.

12. The device of claim 11, in which the locking mechanism comprises:
- a fixture disposed on an exterior wall of the housing;
- the fixture defining an opening operable to receive at least one of (i) a portion of the cable retention knob or (ii) a further portion of the arm or shank of the locking means, and further-operable in cooperation therewith for enabling securement of the cable retention knob relative to the fixture.

13. The device of claim 12, in which the cable retention knob comprises a tab portion as said distal portion; and
- the fixture comprises a u-bar that is disposed with an outward projection from the exterior wall of the housing, the u-bar defines at least in part a slot operable to enable receipt of at least one of the tab portion of the cable retention knob or the further portion of the arm or shank of the locking means.

14. A lock assembly mountable to a vehicle, comprising:
a cable housing defined at least in part by a plurality of walls;
a reel disposed for axial rotation within an interior chamber defined by the plurality of walls for the cable housing;
a cable having a proximal end attached to the reel and having a distal end opposite the proximal end;
a cable retention knob fixed to the distal end of the cable external the cable housing;
a power spring operable to apply a rotational force on the reel for enabling tensioned winding and unwinding of the cable;
a ratchet mechanism operable together with the reel to enable capture of the reel and release of tension on the cable at given incremental extractions of the cable from the cable housing; and
a fixture disposed on a first wall of the plurality for the cable housing, the fixture defining a slot operable to enable receipt of at least a portion of the cable retention knob;
wherein the ratchet mechanism further operable in cooperative configuration with the reel to provide neutral zones along substantially periodic intervals of the cable extension, wherein an interval for one of the neutral zones is defined with an extent comprising multiple lengths of said given incremental extractions, the ratchet mechanism further operable collectively with the reel when within a given neutral zone to free the reel to permit reversal of reel rotation and to apply tension to the cable for retraction under the influence of the power spring.

15. The lock assembly of claim 14, wherein the fixture comprises a u-bar that extends outwardly from the external surface of the first wall for defining the slot between opposing arms of the u-bar; and
the cable retention knob comprises a tab portion of cross-sectional shape adapted to enable clearance when it is inserted through the slot defined by the u-bar.

16. The lock assembly of claim 14, in which the cable retention knob comprises a butt-end that flares radially outward from its junction with the cable.

17. The lock assembly of claim 16, in which the cable retention knob further comprises a mating head joined to the butt-end, the mating head comprising an external surface that defines a tab portion; and
the tab portion further defining a slot of given width sufficient to allow insertion of an arm of a locking means.

18. The lock assembly of claim 17, wherein the fixture defines an opening of diameter and/or width sufficient to allow passage of at least one of the arm of the locking means or the tab portion of the cable retention knob.

19. A lock assembly mountable to a vehicle, comprising:
a cable housing defined at least in part by a plurality of walls;
a reel disposed for axial rotation within an interior chamber defined by the plurality of walls for the cable housing;
a cable having a proximal end attached to the reel and having a distal end opposite the proximal end;
a cable retention knob fixed to the distal end of the cable external the cable housing;
a power spring operable to apply a rotational force on the reel for enabling tensioned retraction and winding of the cable;
a ratchet mechanism operable together with the reel to enable capture of the reel and release of tension on the cable at given incremental extractions of the cable from the cable housing;
a coupler defining a seating surface seated against a given wall of the plurality for the housing and a mounting mechanism operable to mount to a portion of a vehicle, wherein the coupler comprises:
a bottom plate portion defined at least in part by upper and lower surfaces, the lower surface at least in part forming the seating surface;
a top portion defining a horse-shoe shape, per a planar view, along at least a partial circumference thereof; and
sidewalls between the bottom plate portion and the top plate portion and extending therebetween along the partial circumference of the horse-shoe shape, the sidewalls and the horse-shoe shaped top portion collectively defining an annular flange directed radially inward along the partial circumference for the horse-shoe shape;
wherein the bottom plate portion in cooperation with the sidewalls and the annular flange define the mounting mechanism as a flanged-cup with a side access configured to enable an operator to slide a knob of a lower portion of a locking pole of a fifth wheel trailer through the side access and into the heel of the flanged-cup for fitted receipt therein; and
the sidewalls that define in part the flanged-cup for the mounting mechanism further define a pair of holes opposing one another across the side access to the flanged-cup, the opposing holes positioned distal the heel of the flanged-cup and aligned to enable an operator to thread a lock pin therethrough for capturing the knob to the lower portion of the locking pole when seated within the flanged-cup.

20. The lock assembly of claim 19, further comprising a locking mechanism configured to enable an operator to selectively lock the locking pin to the sidewalls when it is operatively disposed through the holes and across the side access.

21. The lock assembly of claim 20, wherein:
the given wall of the plurality for the housing defines a plateaued surface with a threaded opening directed inwardly to the housing;
the bottom plate portion of the coupler further defines a bolt-passage therethrough;
the seating surface defined by the lower surface of the bottom plate portion for the coupler is defined with one of a flat or contour to mate with the plateaued surface with a substantial axial alignment of the bolt-passage relative to the threaded-opening; and
the fastener comprises a bolt threaded through the bolt-passage and into the threaded-opening of the housing to fasten the coupler to the plateaued surface.

22. The lock assembly of claim 21, wherein the bolt-passage in the lower plate portion of the coupler is positioned in the heel region of the cup-shape to the coupler.

23. The lock assembly of claim 5, further comprising a locking mechanism defined at least in part by the lock pin, the locking mechanism operable to enable an operator to lock the locking pin to the sidewalls when the lock pin is disposed in the holes.

24. The lock assembly of claim 4, wherein:
the given wall of the plurality for the housing defines a plateaued surface with an orifice extending inwardly to the housing and substantially perpendicular to the plateaued surface;

the bottom plate portion of the coupler further defines an orifice passing therethrough;

the seating surface defined by the lower surface of the bottom plate portion for the coupler is defined with one of a flat or contour operable to mate with the plateaued surface for a substantial axial alignment of the orifice of the bottom plate portion relative to the orifice of the plateaued surface; and the fastener comprises a bolt threaded through the orifice and of the bottom plate of the coupler and into that of the plateaued surface for aligning and fastening of the coupler to the plateaued surface.

25. The lock assembly of claim 24, wherein the orifice defined in the lower plate portion of the coupler is formed in a heel location of the cup-shape of the coupler for enabling operability in combination with a locking pole of a fifth-wheel trailer when seated therein, to block access to the bolt.

* * * * *